(12) United States Patent
Lundkvist et al.

(10) Patent No.: US 12,464,978 B2
(45) Date of Patent: Nov. 11, 2025

(54) NAVIGATING A ROBOTIC MOWER ALONG A WIRE

(71) Applicant: Greenworks (Jiangsu) Co., Ltd., Changzhou (CN)

(72) Inventors: Andre Lundkvist, Habo (SE); Daniel Truong, Torshälla (SE)

(73) Assignee: Greenworks (Jiangsu) Co., Ltd., Changzhou (CN)

( * ) Notice: Subject to any disclaimer, the term of this patent is extended or adjusted under 35 U.S.C. 154(b) by 215 days.

(21) Appl. No.: 18/327,868

(22) Filed: Jun. 1, 2023

(65) Prior Publication Data
US 2023/0320267 A1    Oct. 12, 2023

Related U.S. Application Data

(63) Continuation of application No. PCT/CN2020/139432, filed on Dec. 25, 2020.

(51) Int. Cl.
| | | |
|---|---|---|
| *A01D 34/00* | (2006.01) | |
| *A01D 101/00* | (2006.01) | |
| *G05D 1/247* | (2024.01) | |
| *G05D 105/15* | (2024.01) | |
| *G05D 107/20* | (2024.01) | |

(52) U.S. Cl.
CPC .......... *A01D 34/008* (2013.01); *G05D 1/247* (2024.01); *A01D 2101/00* (2013.01); *G05D 2105/15* (2024.01); *G05D 2107/23* (2024.01)

(58) Field of Classification Search
CPC .. A01D 34/008; A01D 2101/00; G05D 1/247; G05D 1/0225; G05D 1/0265; G05D 2105/15; G05D 2107/23
See application file for complete search history.

(56) References Cited

U.S. PATENT DOCUMENTS

| | | | |
|---|---|---|---|
| 8,942,862 B2 | 1/2015 | Markusson | |
| 2012/0029753 A1* | 2/2012 | Johnson | B60L 15/2036 |
| | | | 701/23 |
| 2019/0380266 A1 | 12/2019 | Liljedahl | |
| 2020/0042008 A1 | 2/2020 | Strandberg | |
| 2021/0037703 A1* | 2/2021 | Holgersson | G05D 1/648 |
| 2021/0272438 A1* | 9/2021 | Askenmalm | B25J 9/0003 |

FOREIGN PATENT DOCUMENTS

| | | | | |
|---|---|---|---|---|
| CN | 102692922 B | * | 7/2015 | |
| CN | 109690436 A | | 4/2019 | |
| WO | WO-2019153616 A1 | * | 8/2019 | .......... A01D 34/008 |
| WO | 2021208010 A1 | | 10/2021 | |
| WO | 2022021299 A1 | | 2/2022 | |
| WO | 2022082334 A1 | | 4/2022 | |

* cited by examiner

*Primary Examiner* — Michael J Zanelli

(57) ABSTRACT

A method navigates a robotic mower (2) by means of a wire (4, 8). The robotic mower (2) comprises at least one sensor (12, 14). The method comprises controlling the robotic mower (2) to exit a parking position at a station (11), wherein in the parking position the robotic mower (2) is at least partially arranged at an inside of a loop (10) of the station (11), determining that the robotic mower (2) has moved further outside of the loop (10) by detecting at least one signal of the loop (10) by means of the at least one sensor (12, 14), detecting at least one signal of the wire (4, 8) by means of the at least one sensor (12, 14) and controlling the robotic mower (2) to straddle along the wire (4, 8).

23 Claims, 23 Drawing Sheets

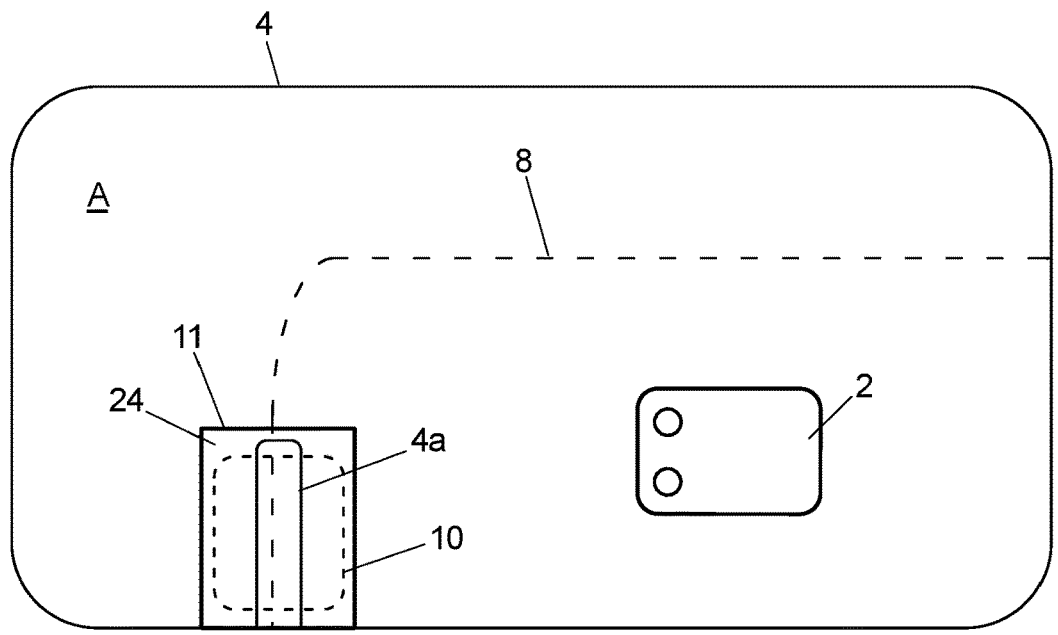
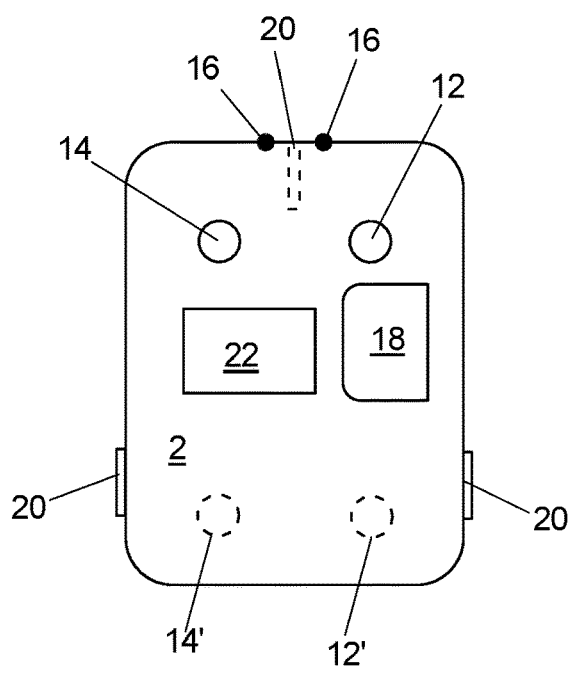
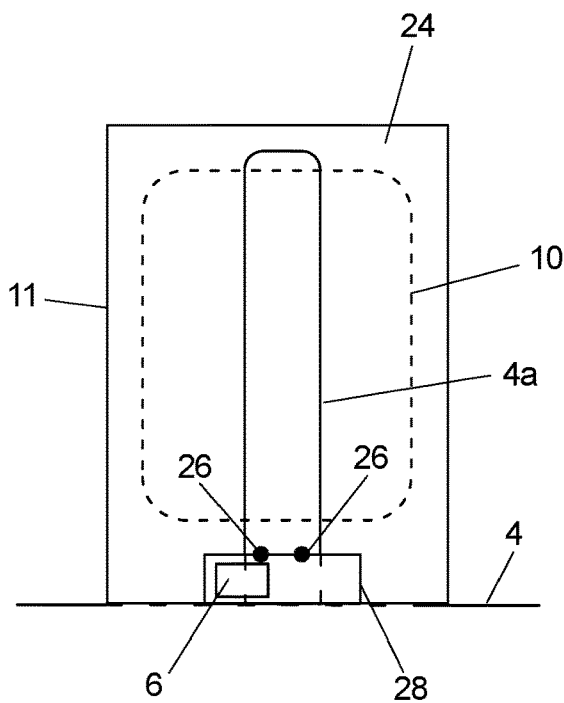

FIG 4
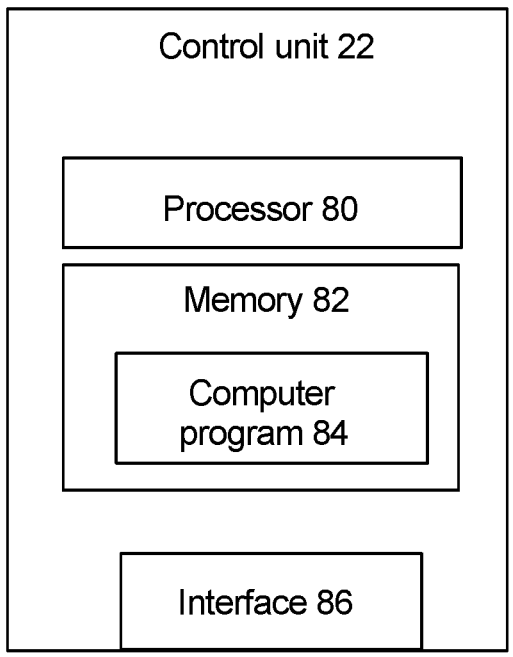
FIG 5
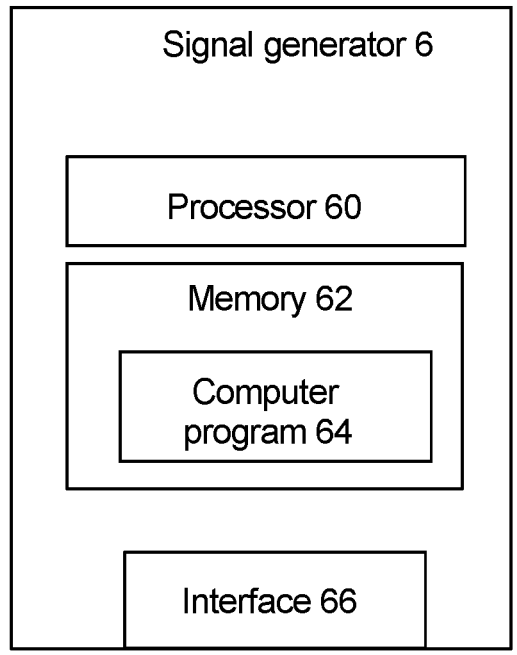
FIG 6.1
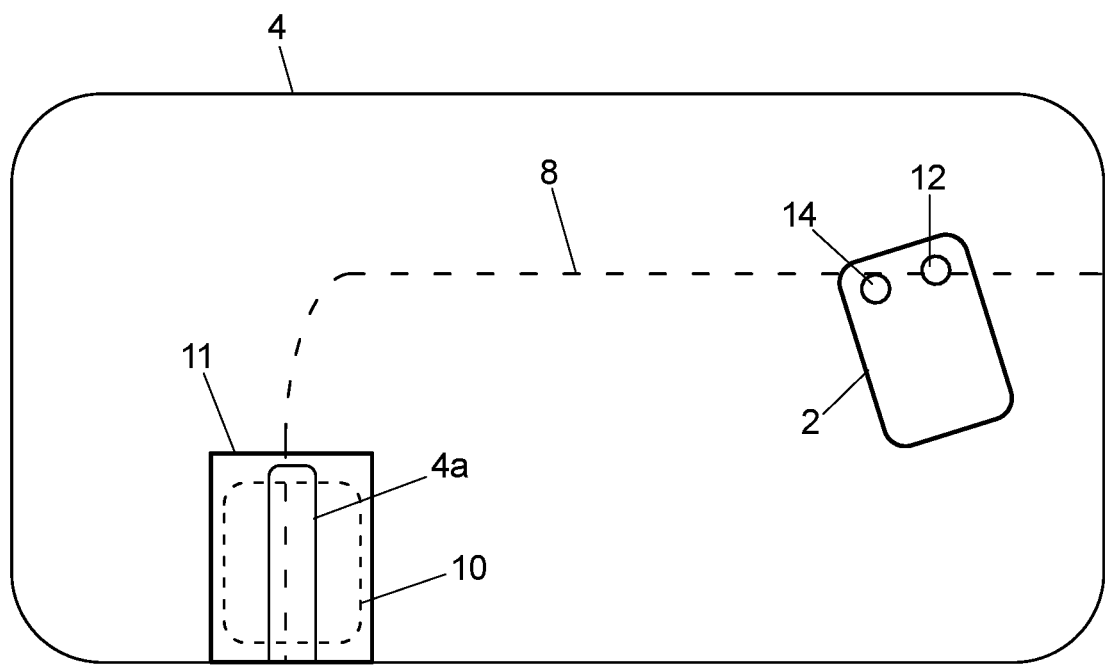

FIG 6.2
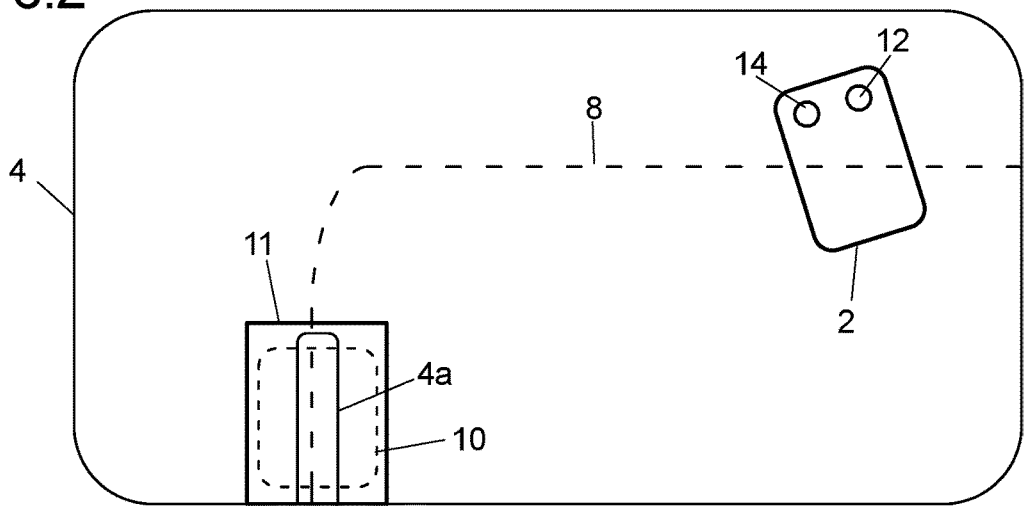
FIG 6.3
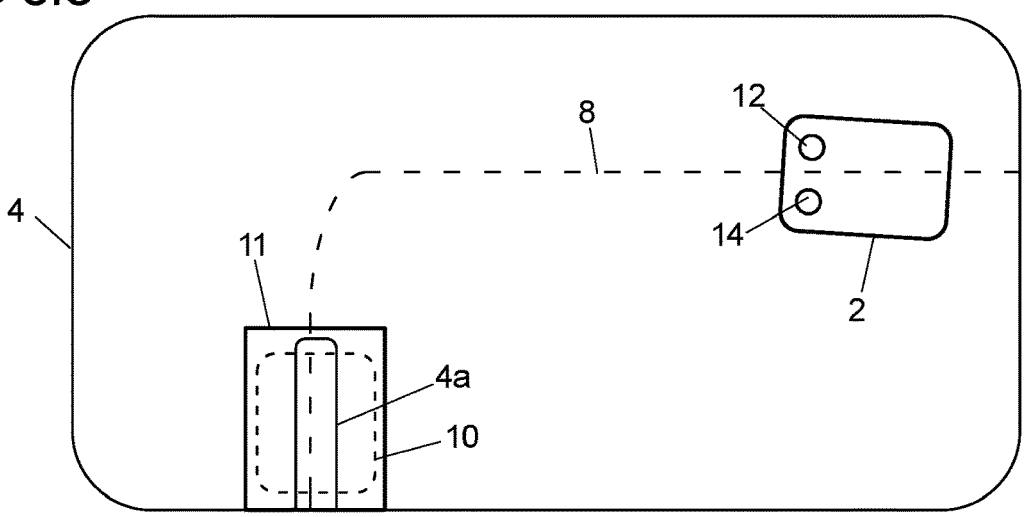
FIG 6.4
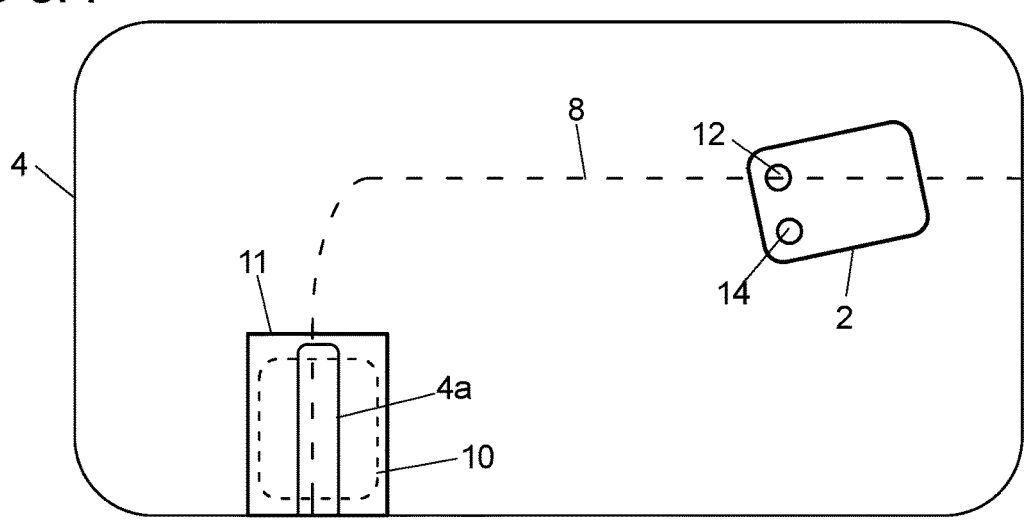

FIG 6.5
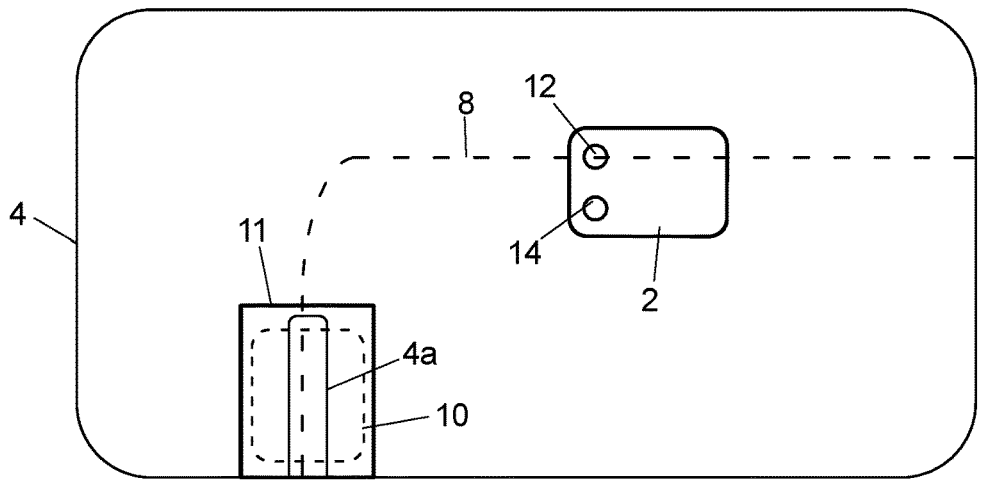
FIG 6.6
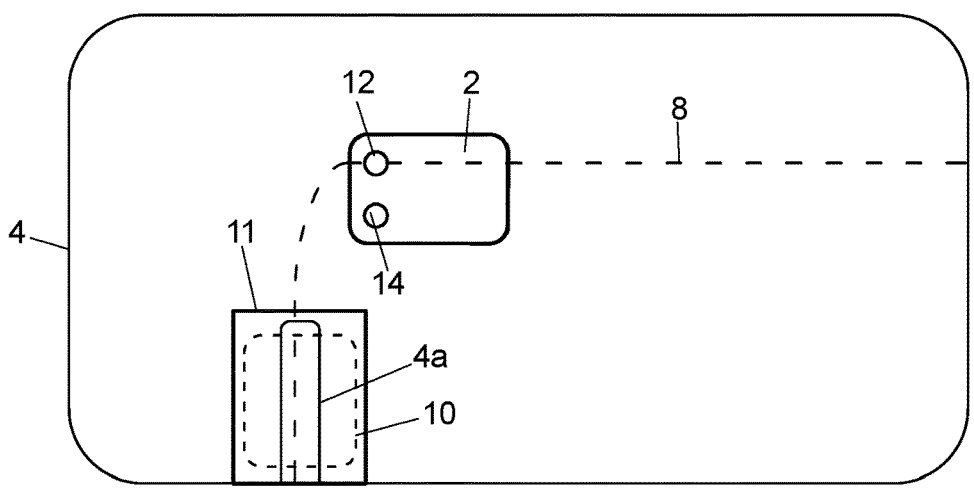
FIG 6.7
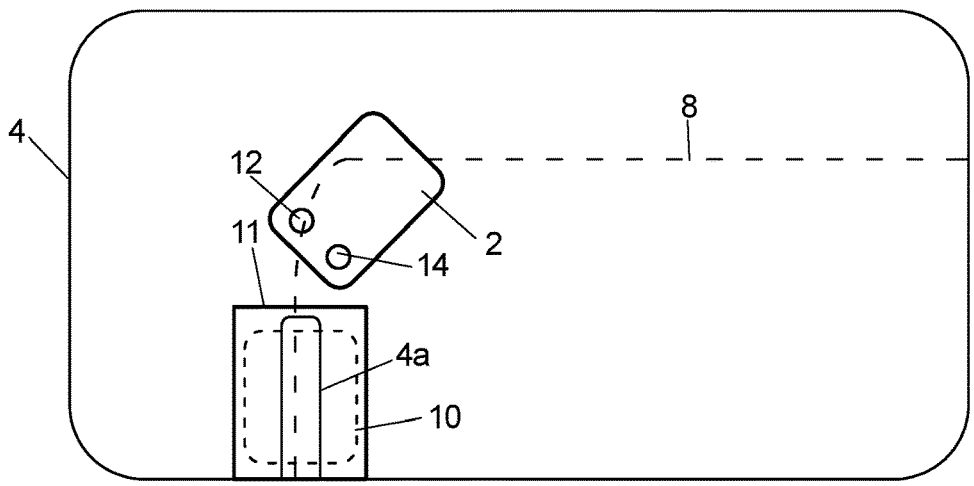

FIG 6.8
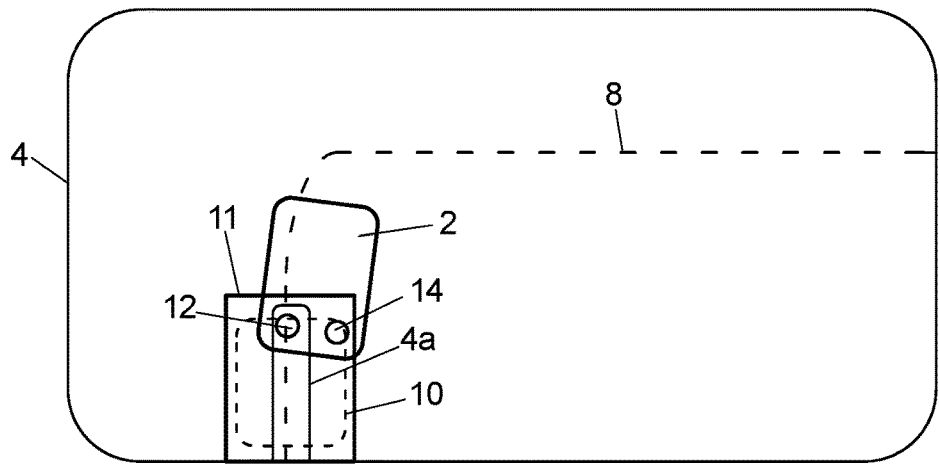
FIG 6.9
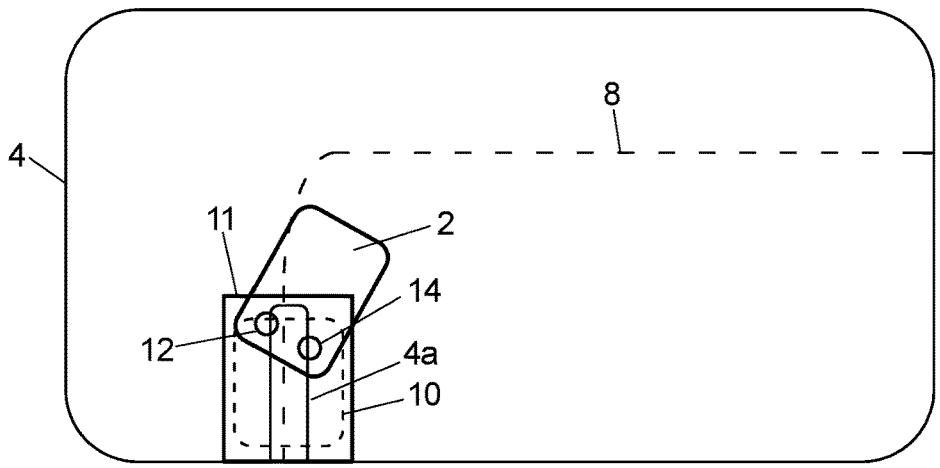
FIG 6.10
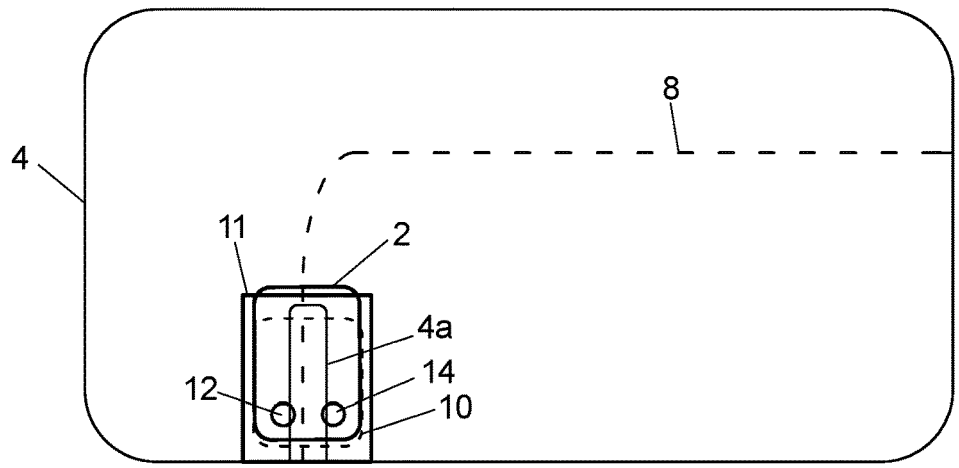

FIG 6.11
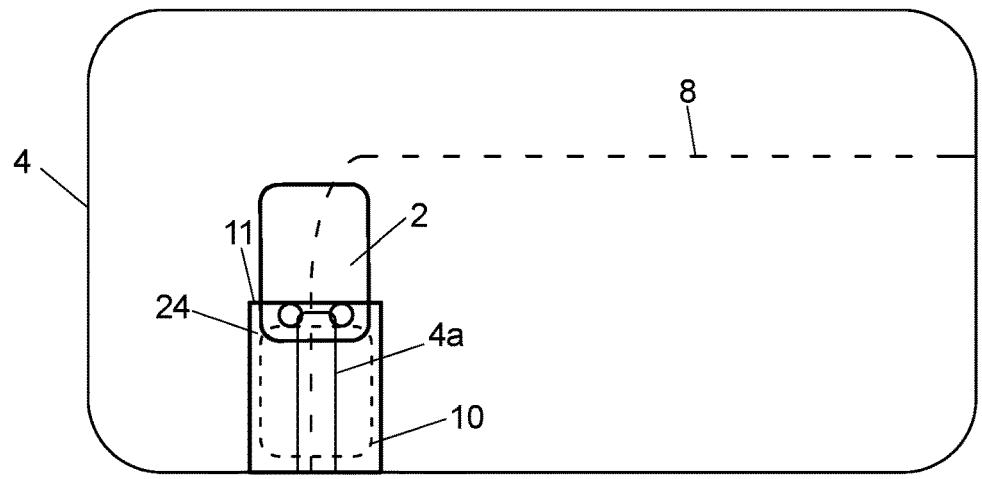
FIG 6.12
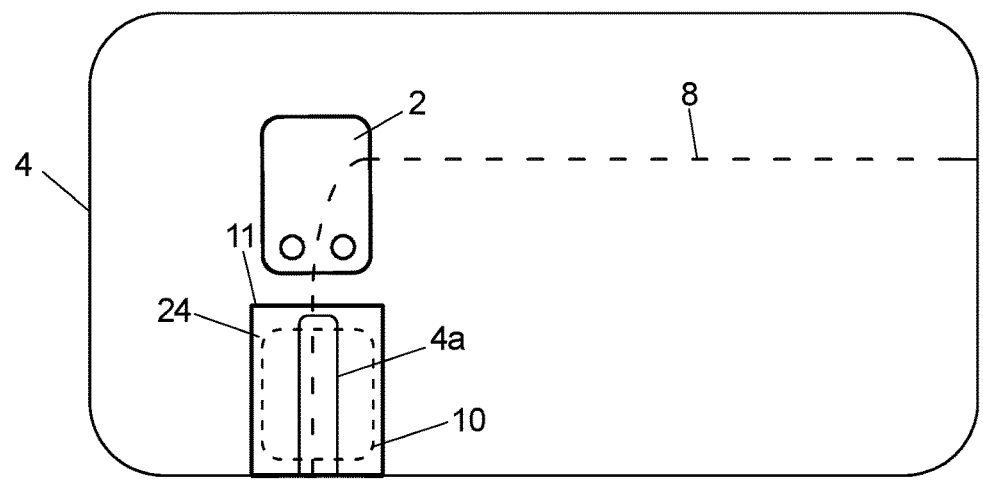
FIG 6.13
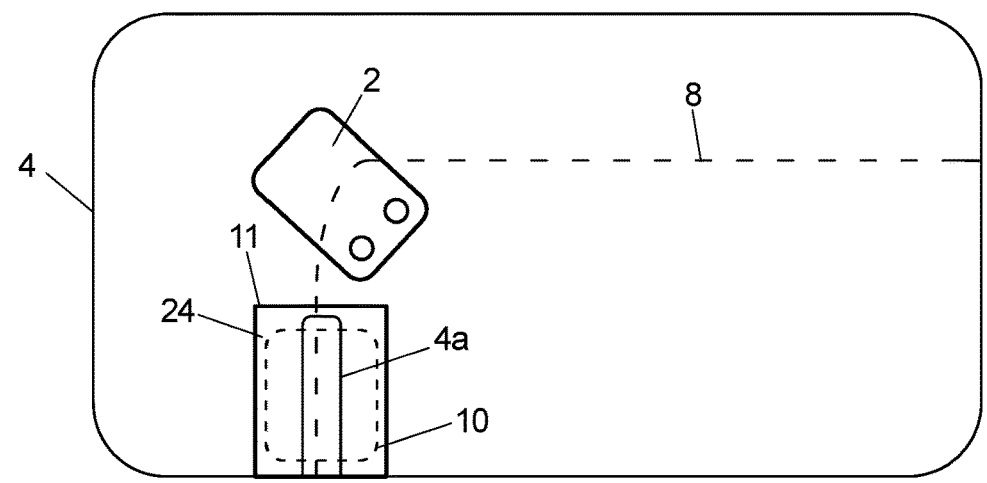

FIG 6.14
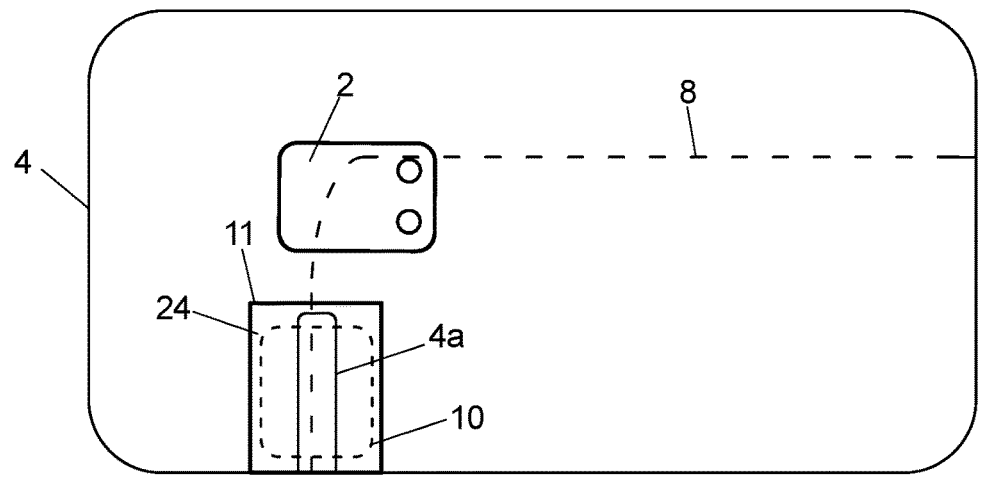
FIG 6.15
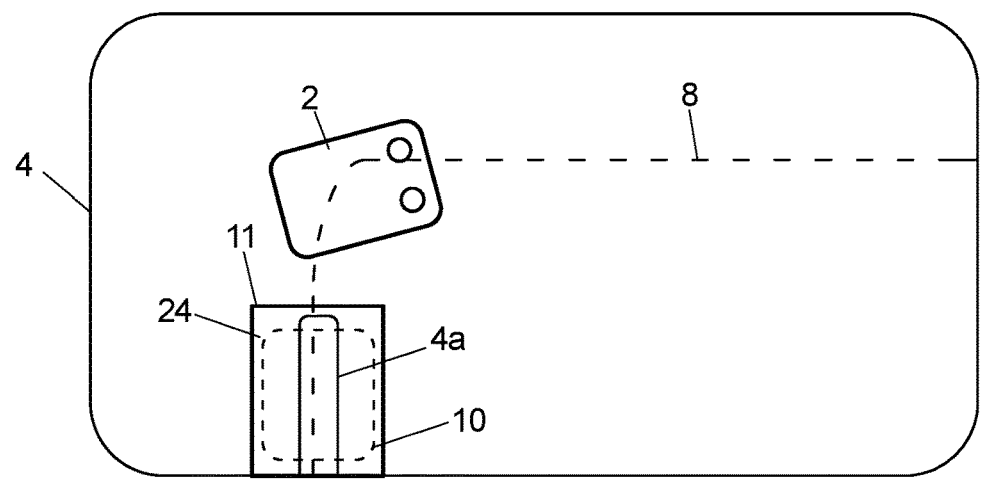
FIG 6.16
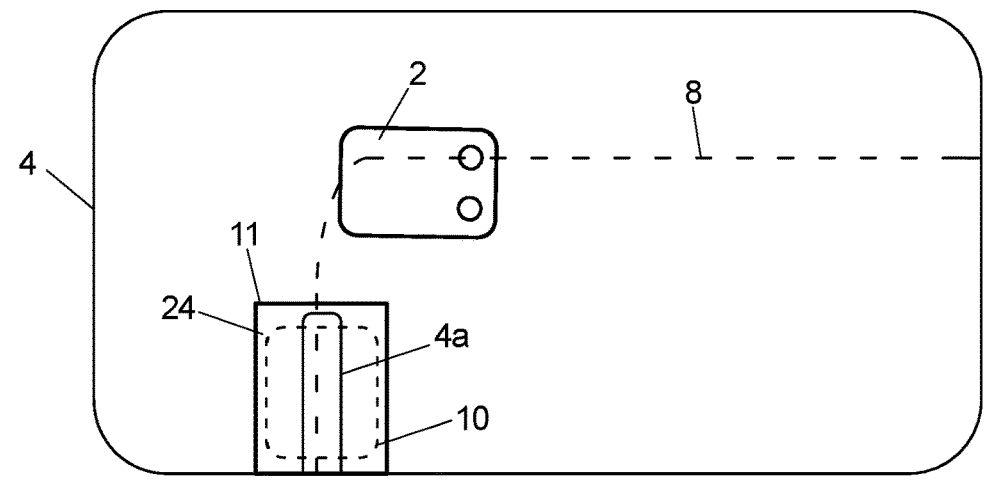

FIG 6.17
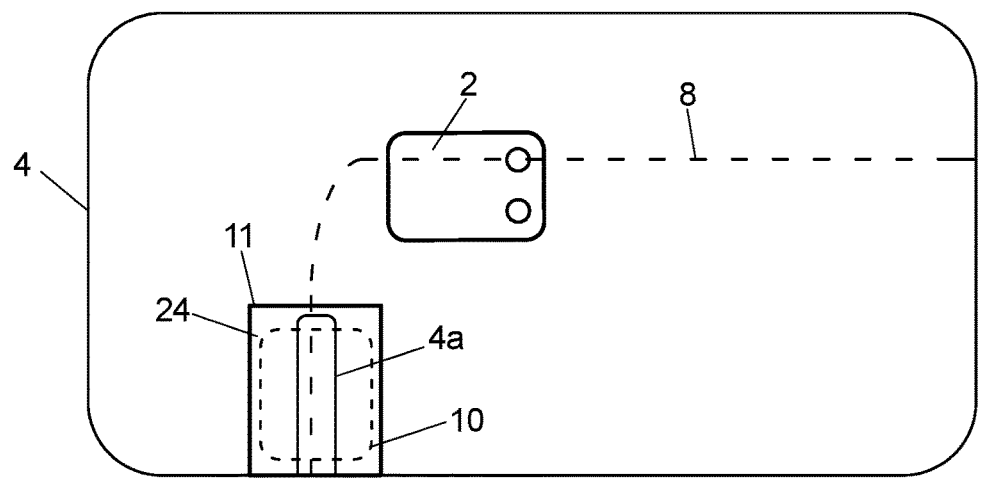
FIG 6.18
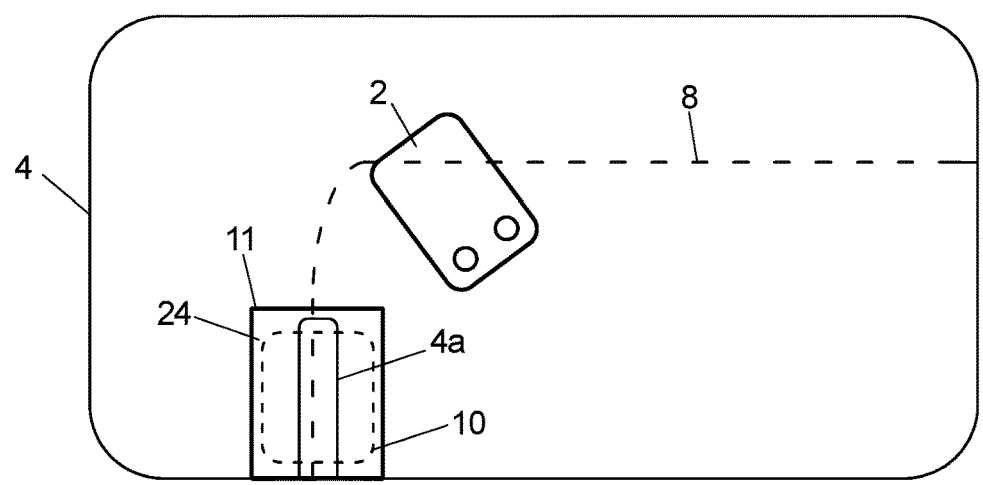
FIG 6.19
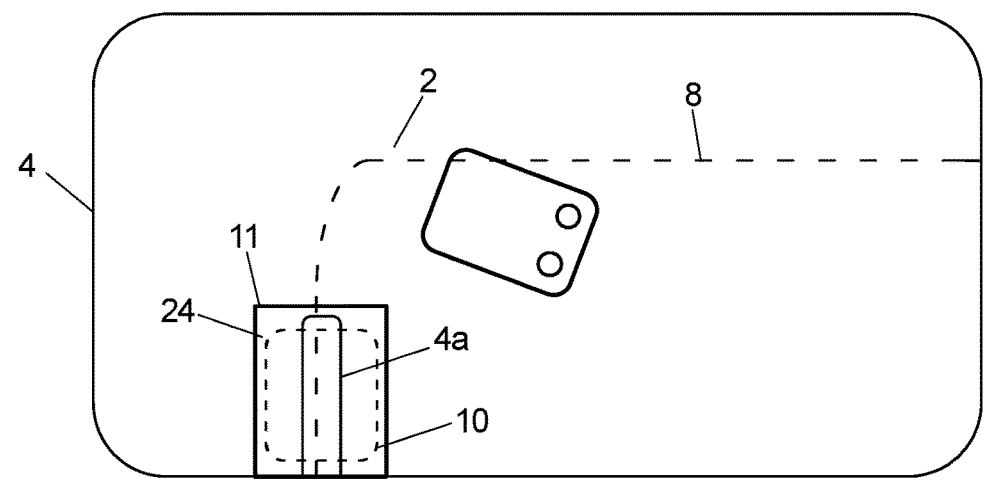

FIG 6.20
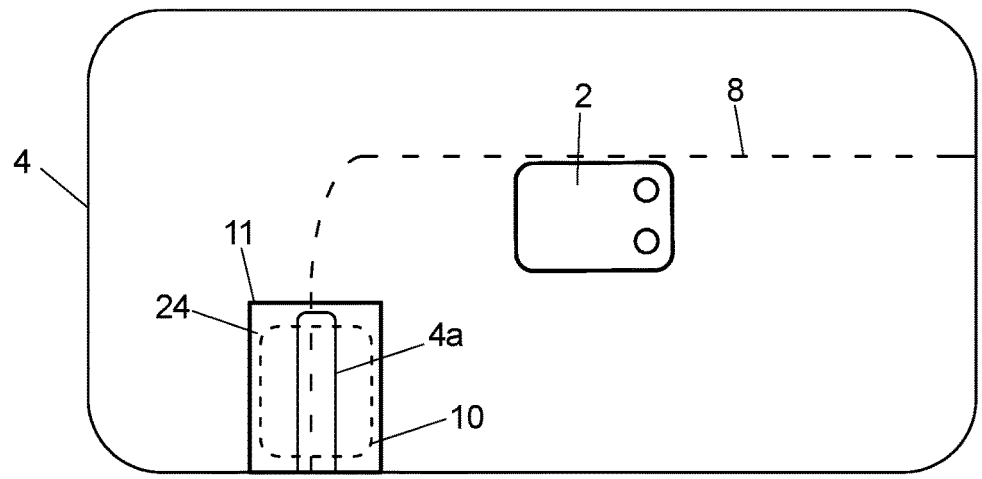
FIG 6.21
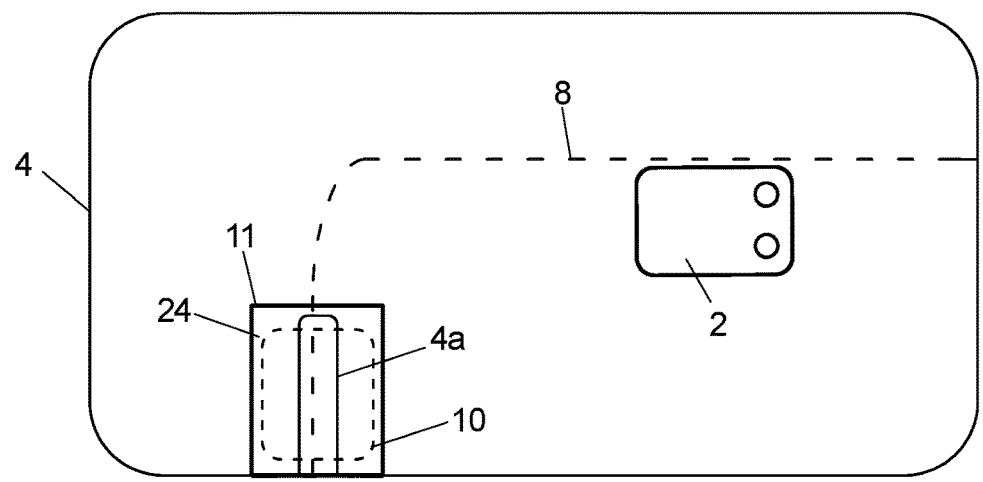
FIG 6.22
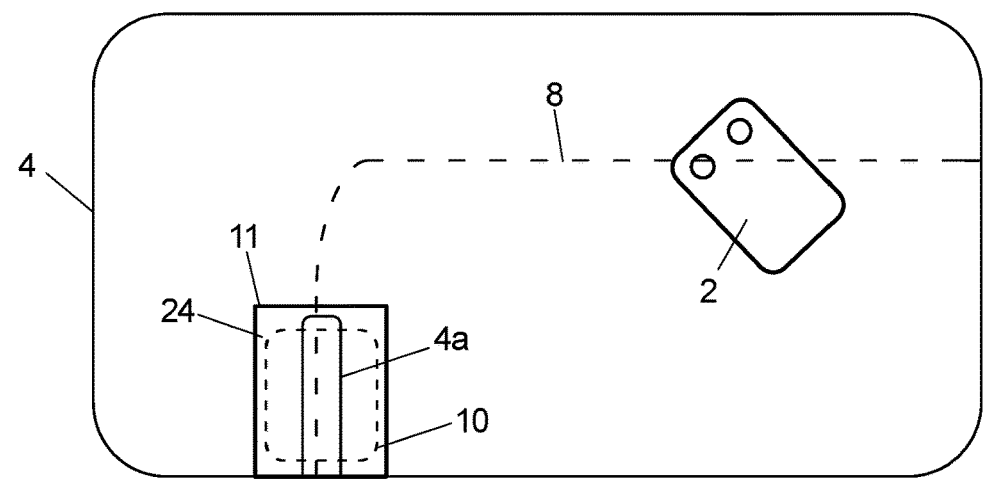

FIG 7.1
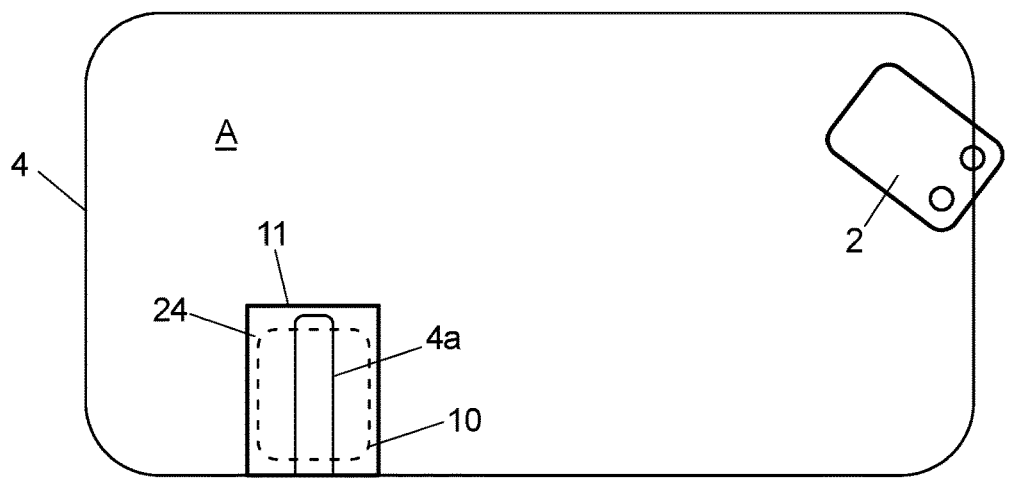
FIG 7.2
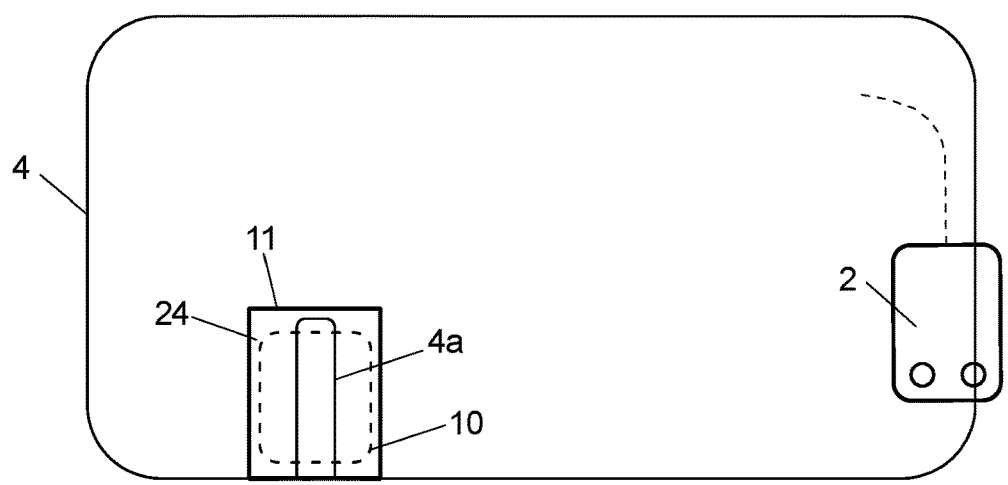
FIG 7.3
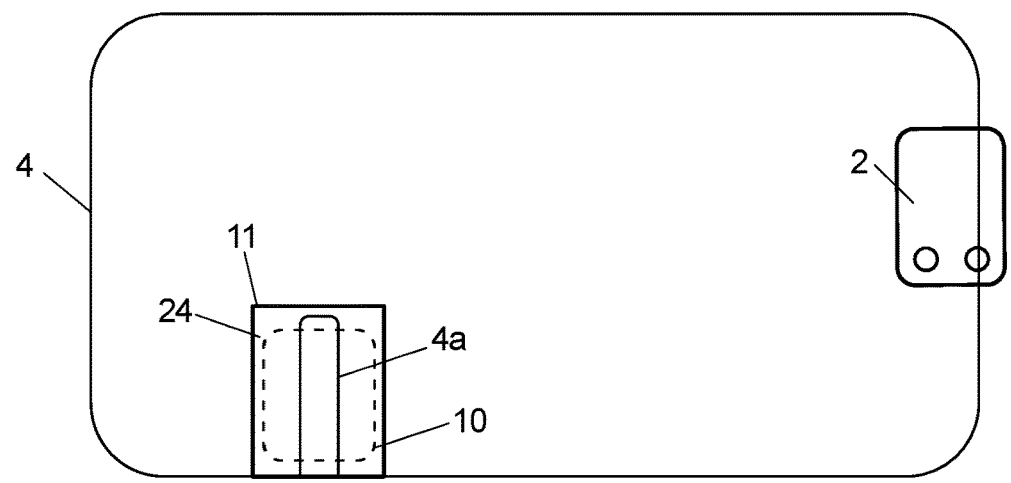

FIG 7.4
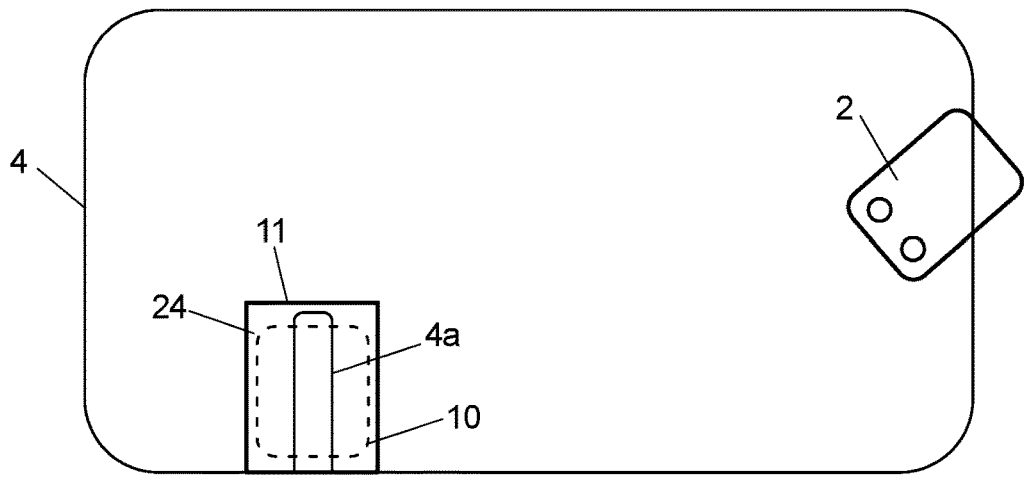
FIG 7.5
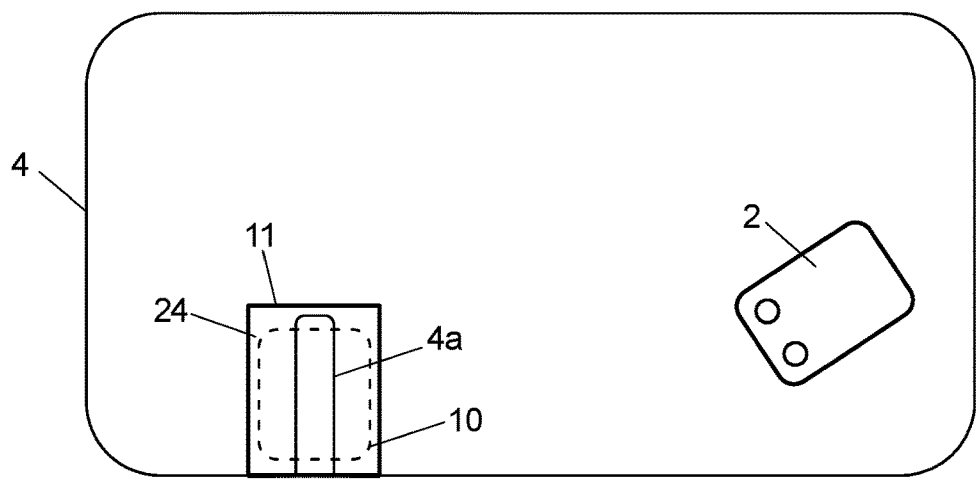
FIG 7.6
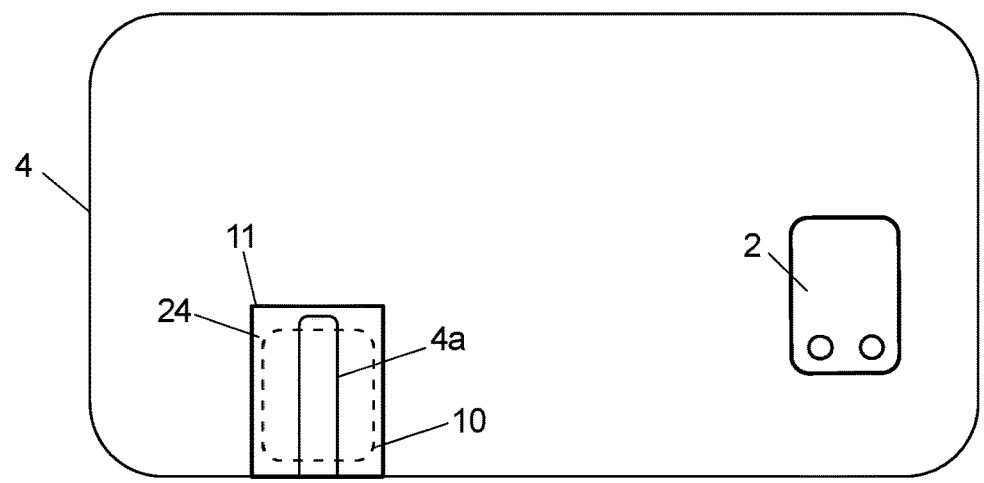

FIG 7.7
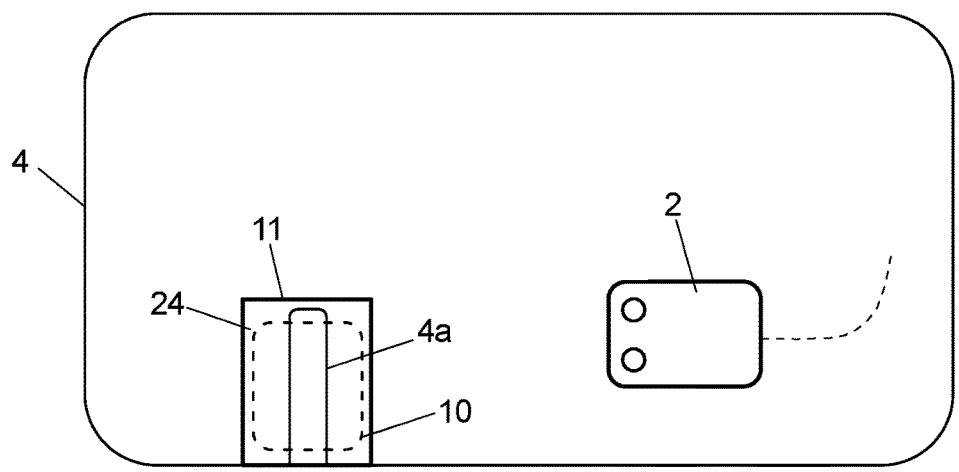
FIG 7.8
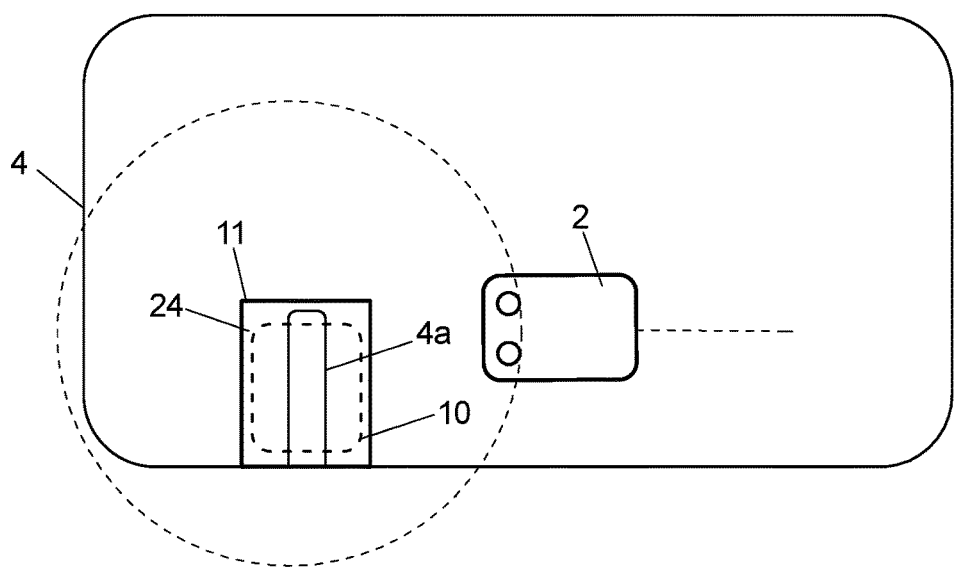
FIG 7.9
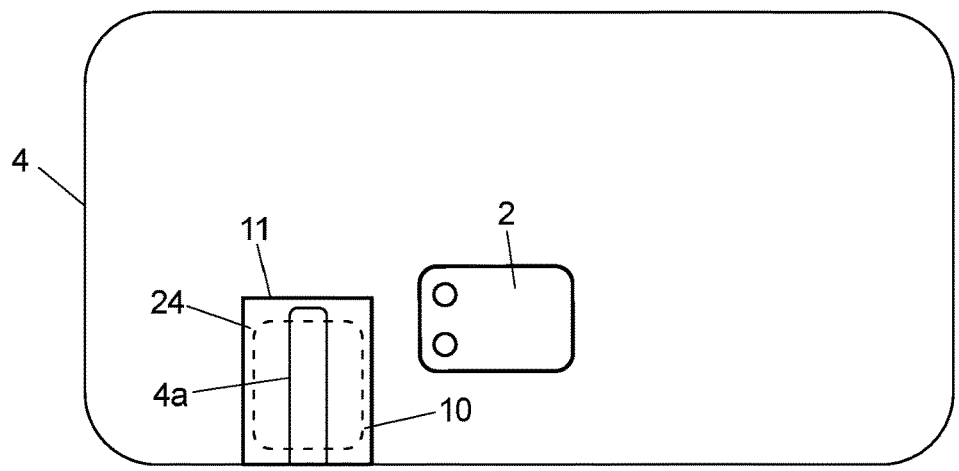

FIG 7.10
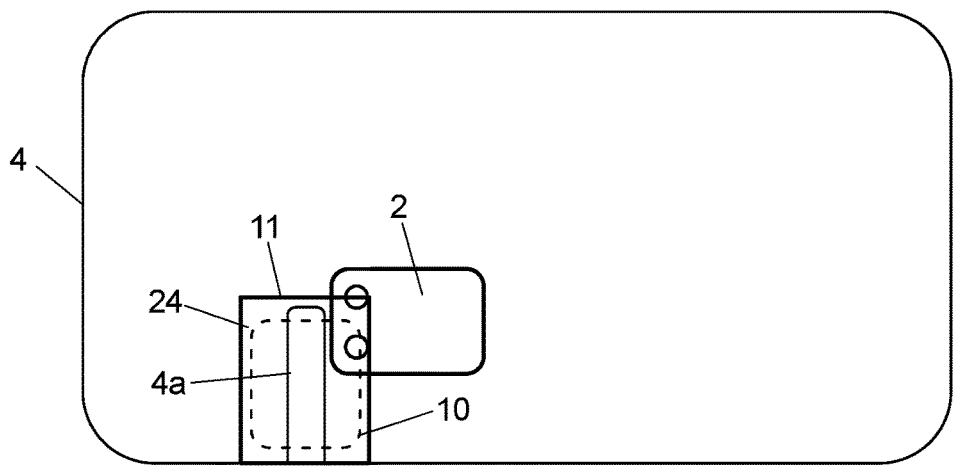
FIG 7.11
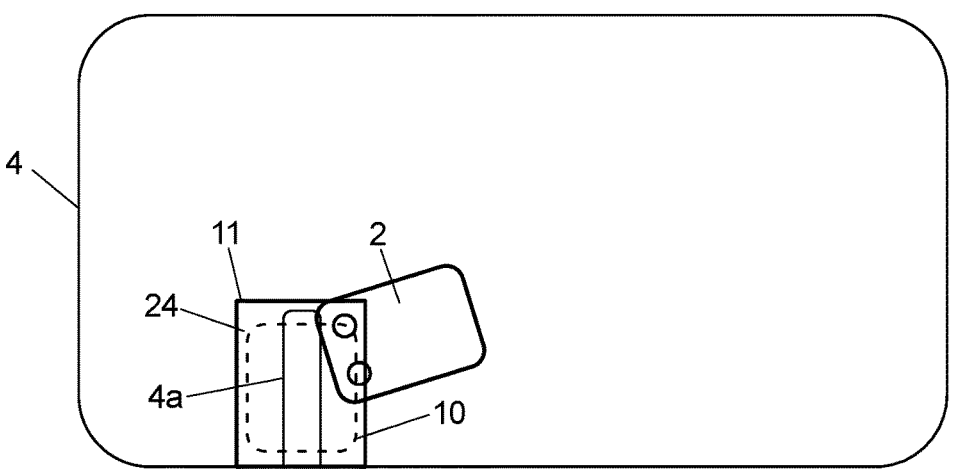
FIG 7.12
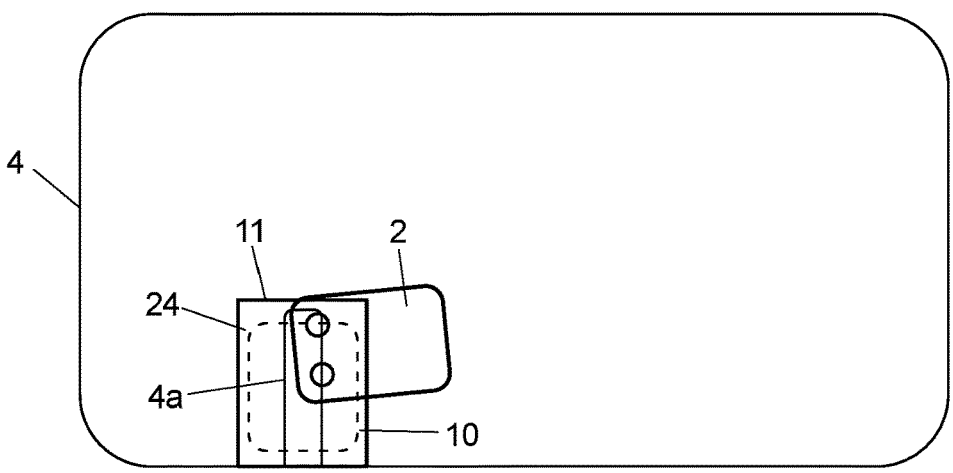

FIG 7.13
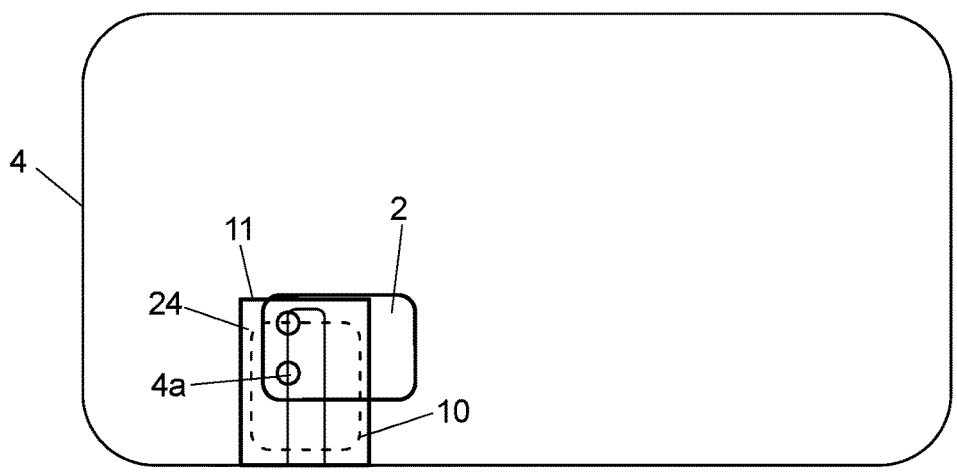
FIG 7.14
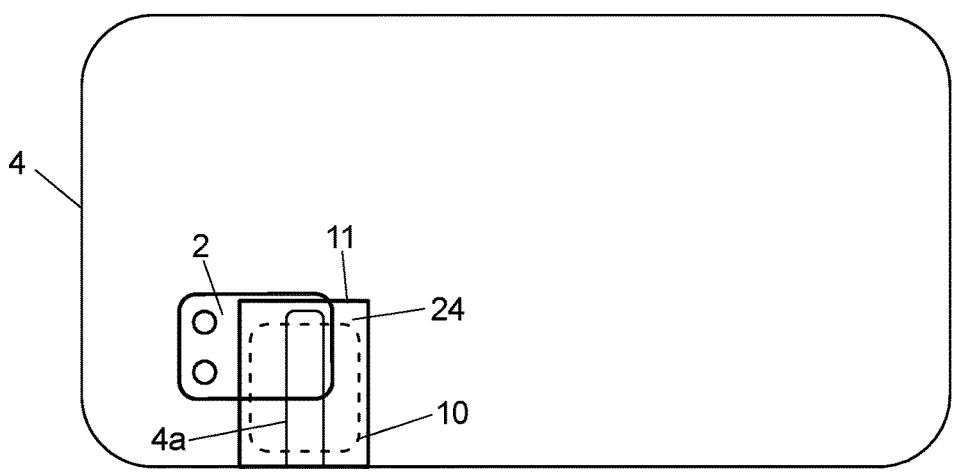
FIG 7.15
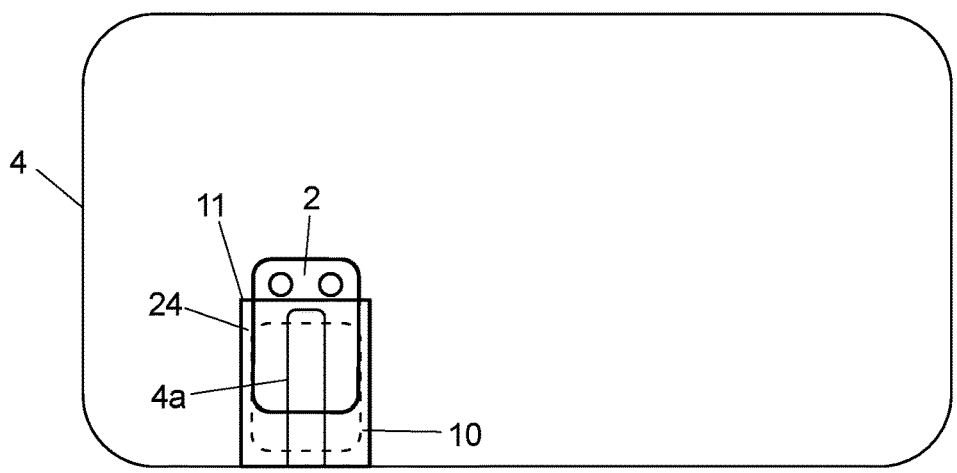

FIG 7.16
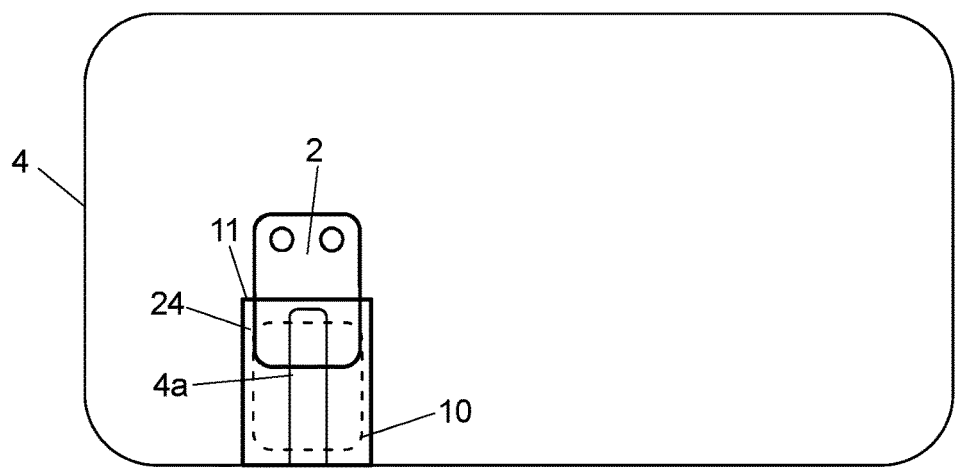
FIG 7.17
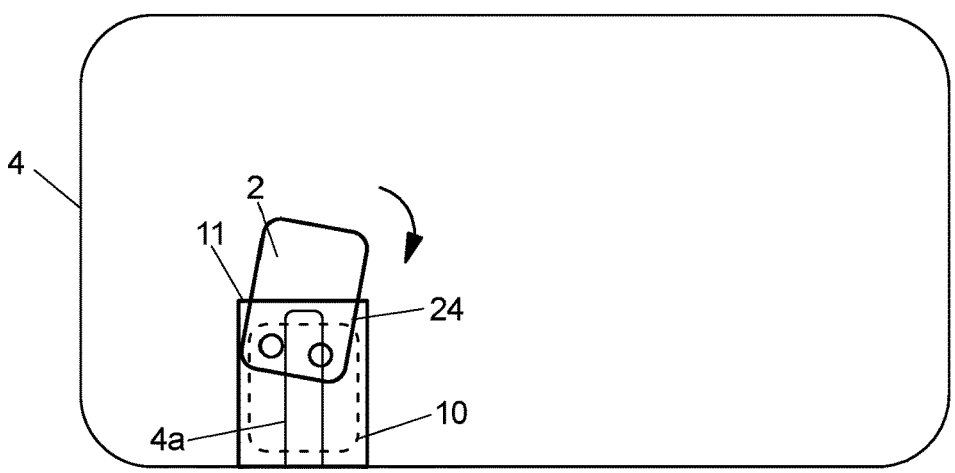
FIG 7.18
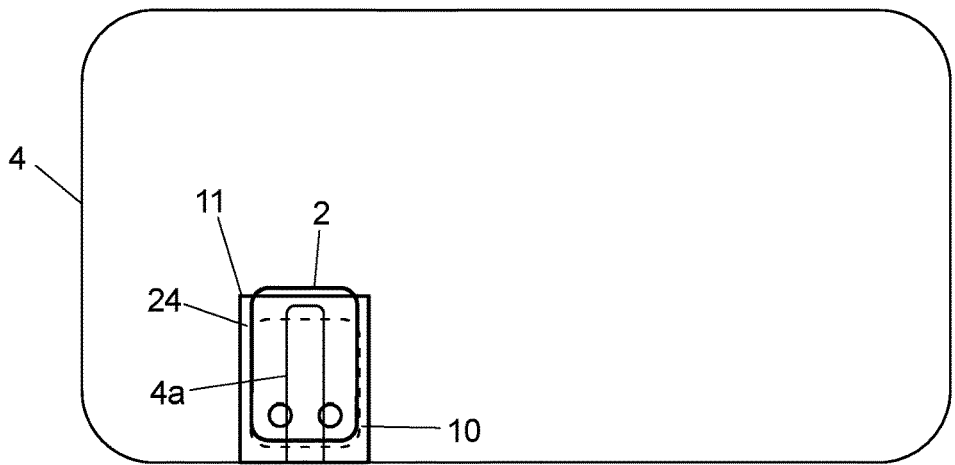

FIG 7.19
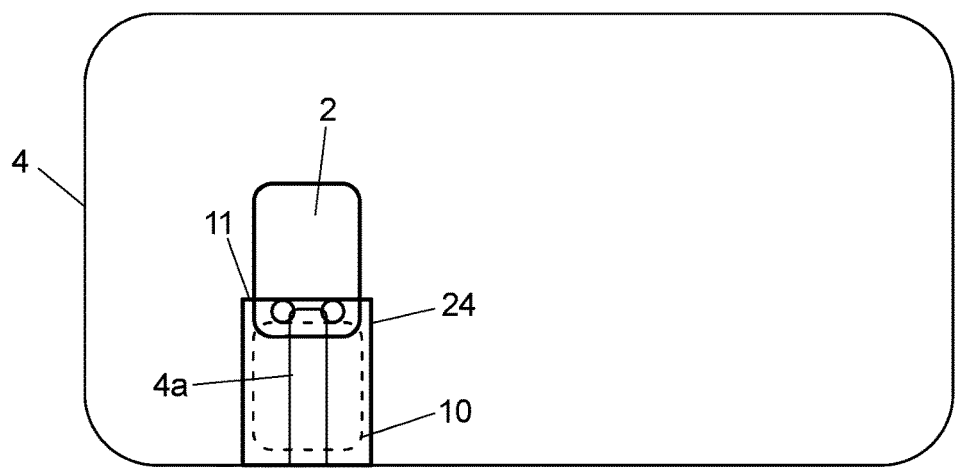
FIG 7.20
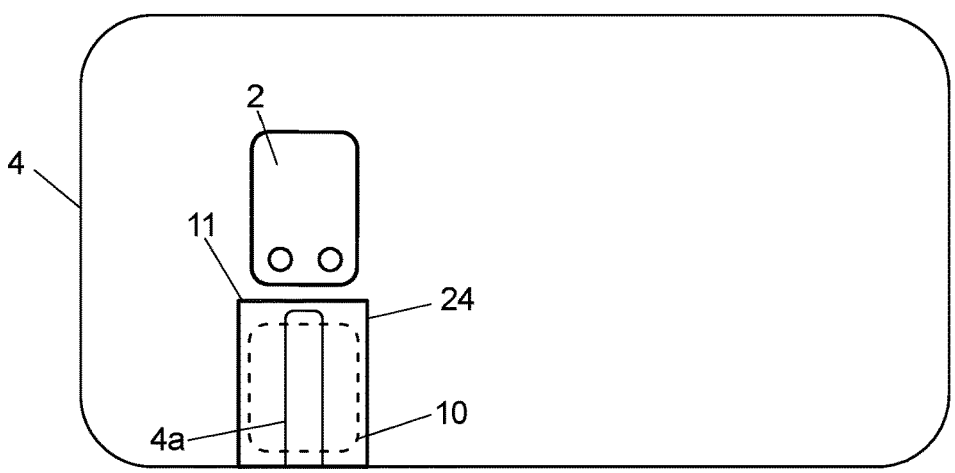
FIG 7.21
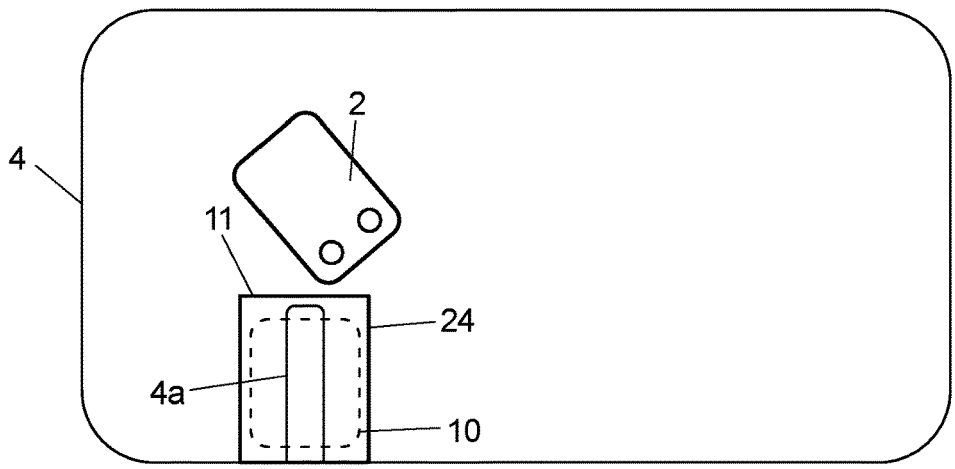

FIG 7.22
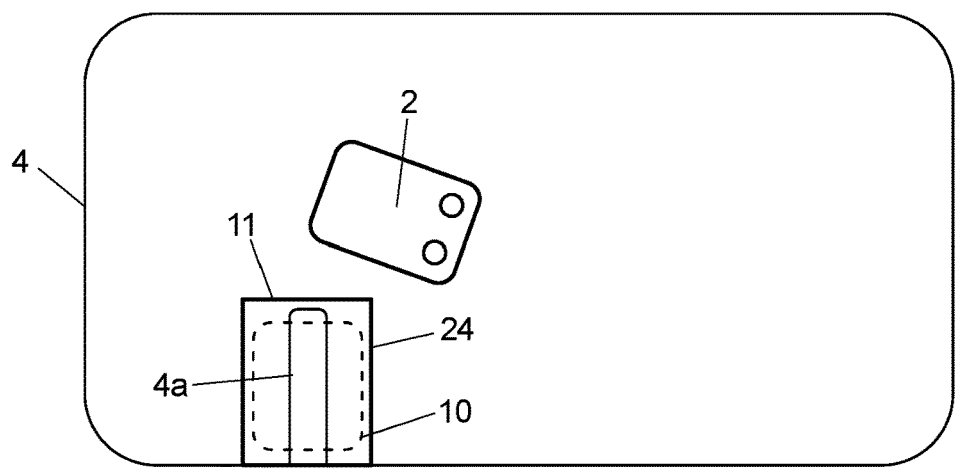
FIG 7.23
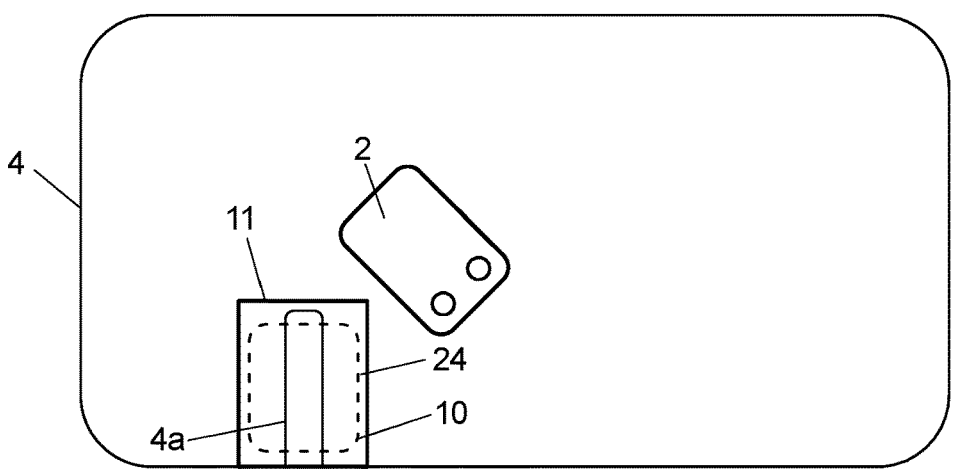
FIG 7.24
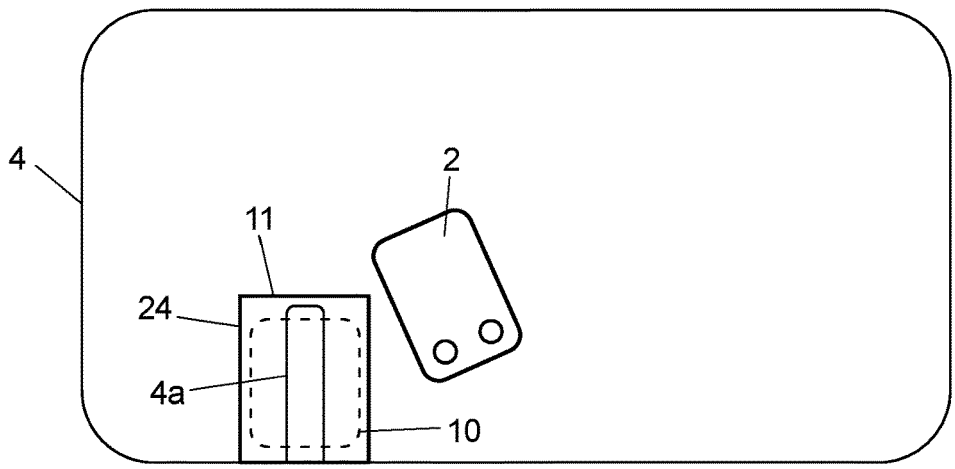

FIG 7.25
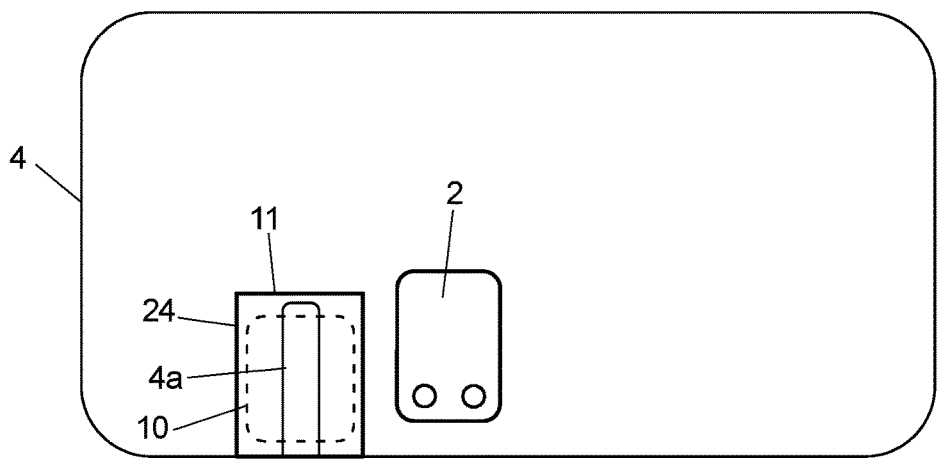
FIG 7.26
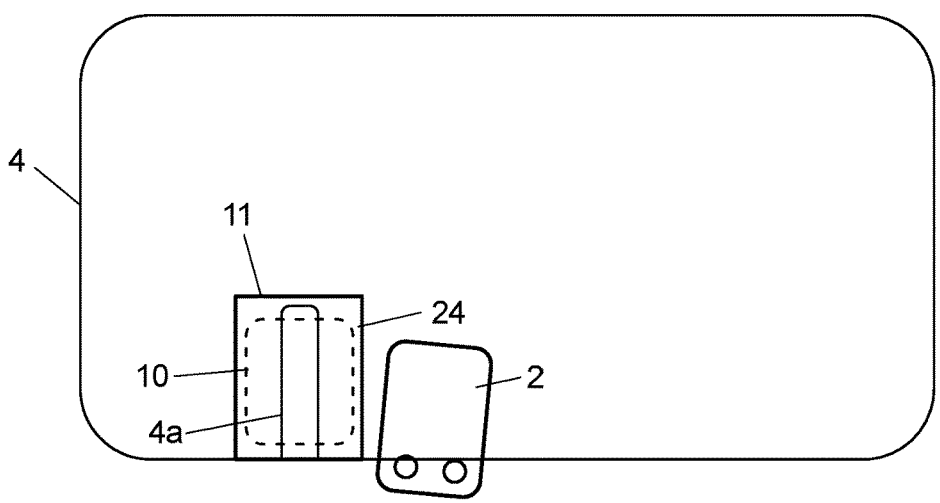
FIG 7.27
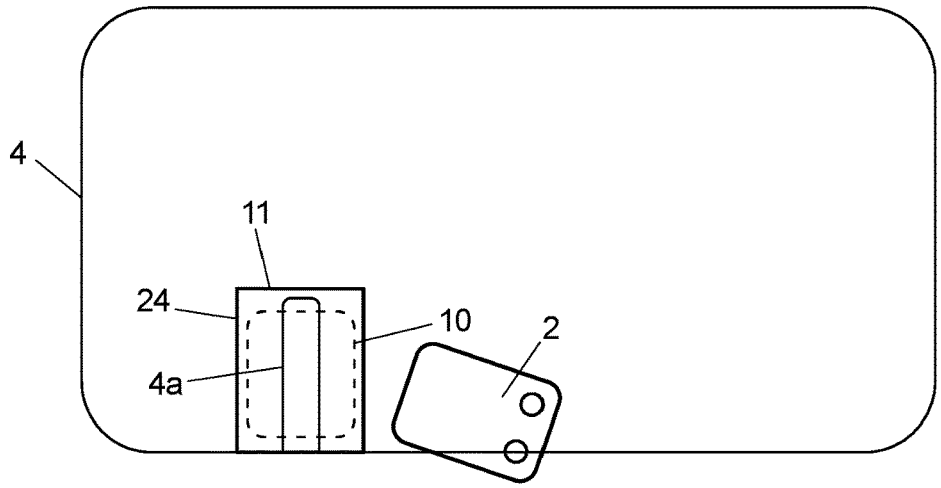

FIG 7.28
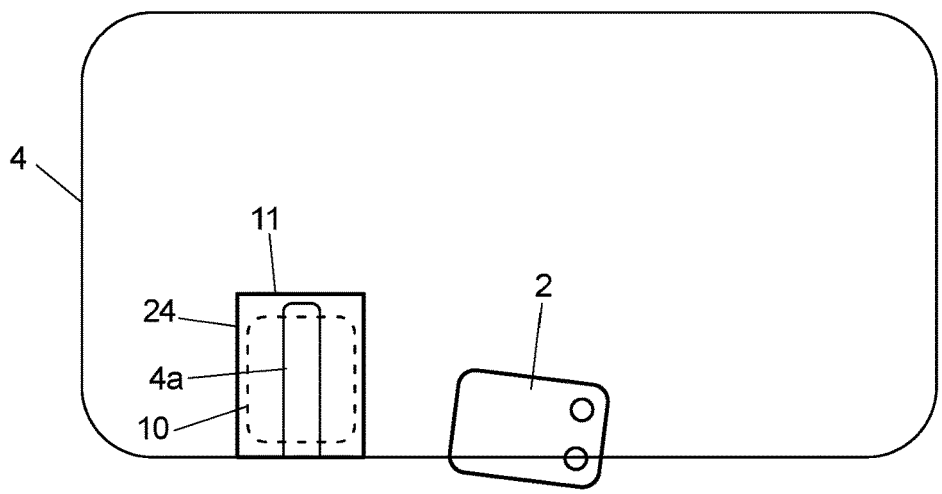
FIG 7.29
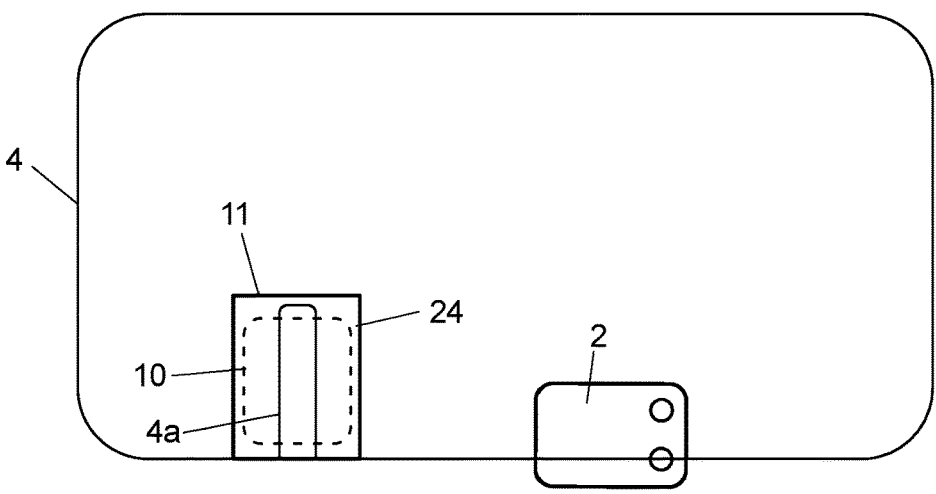
FIG 7.30
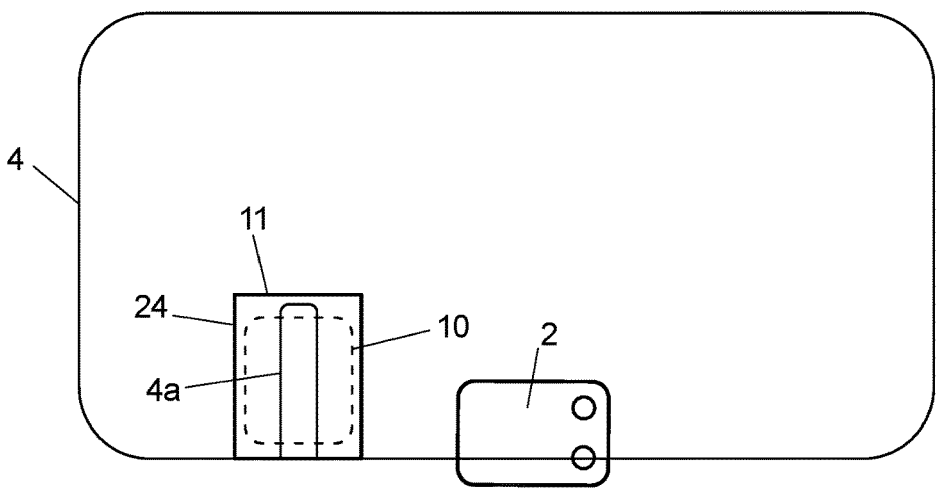

FIG 7.31
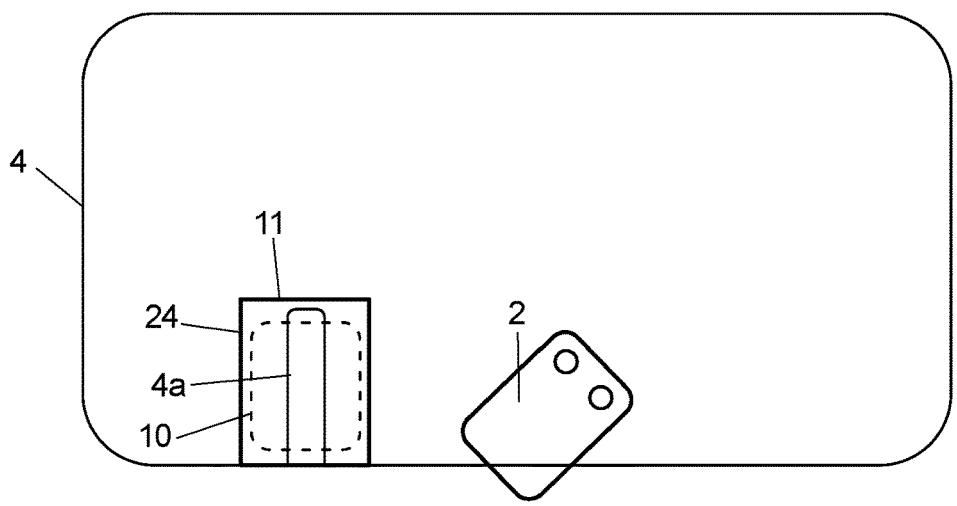
FIG 7.32
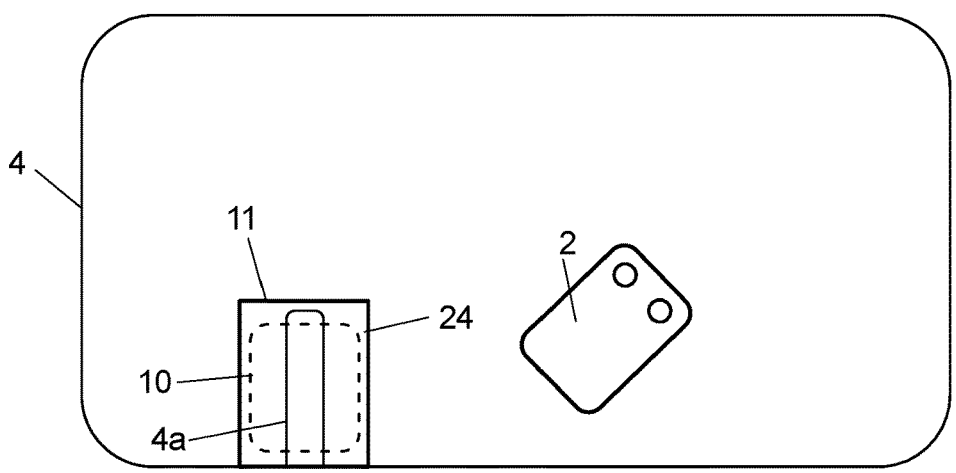
FIG 7.33
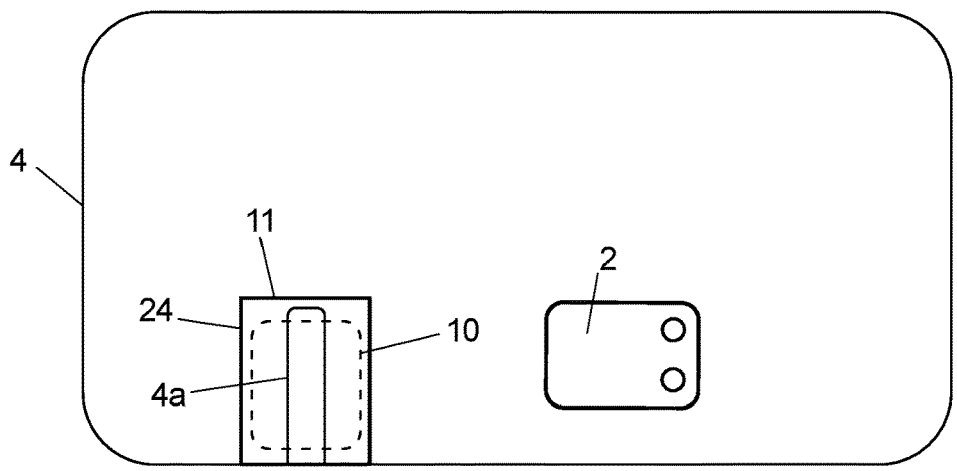

FIG 7.34
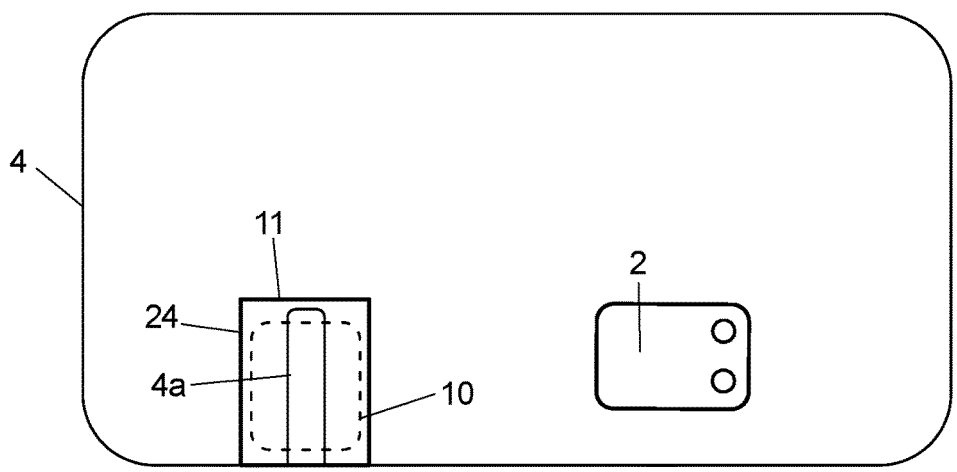
FIG 7.35
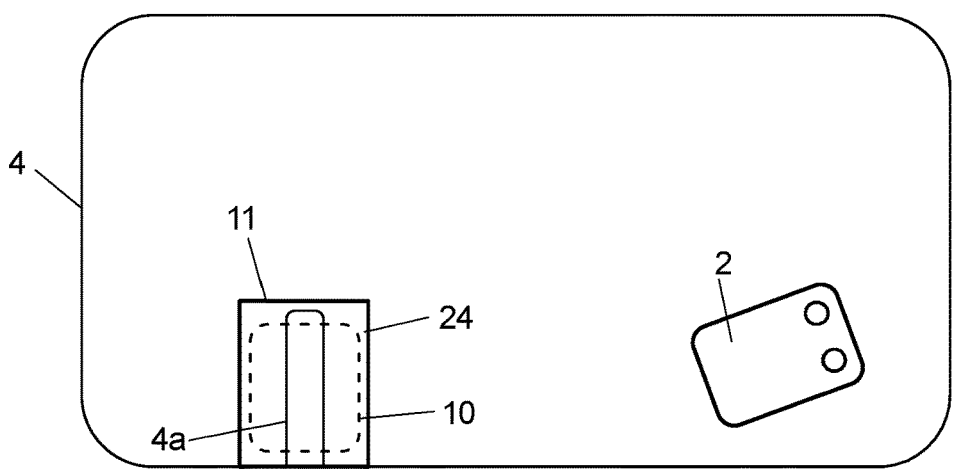
FIG 7.36
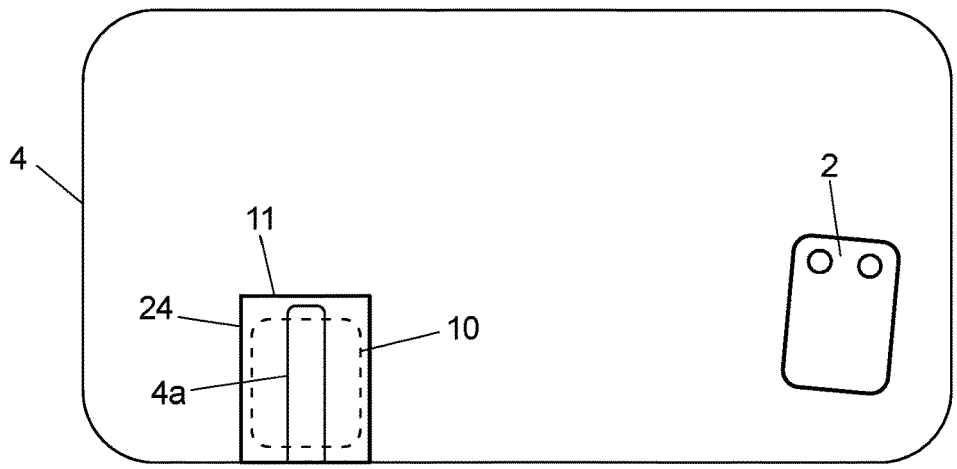

FIG 7.37
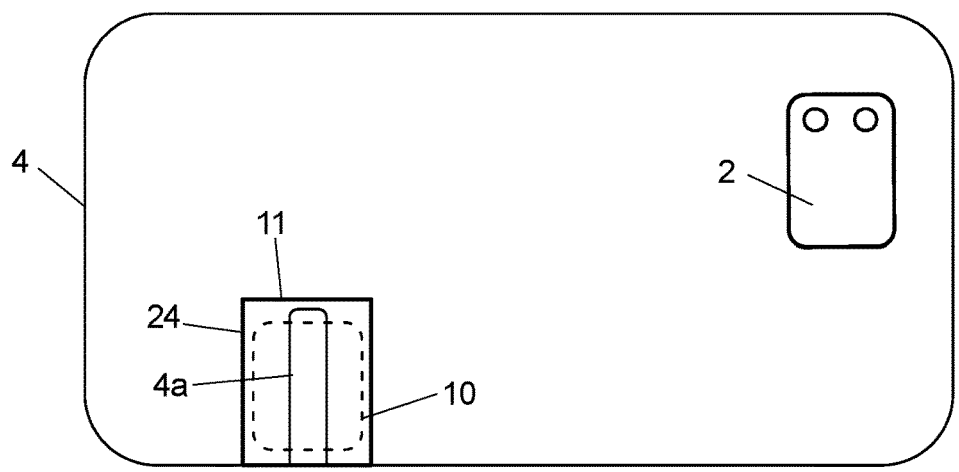
FIG 7.38
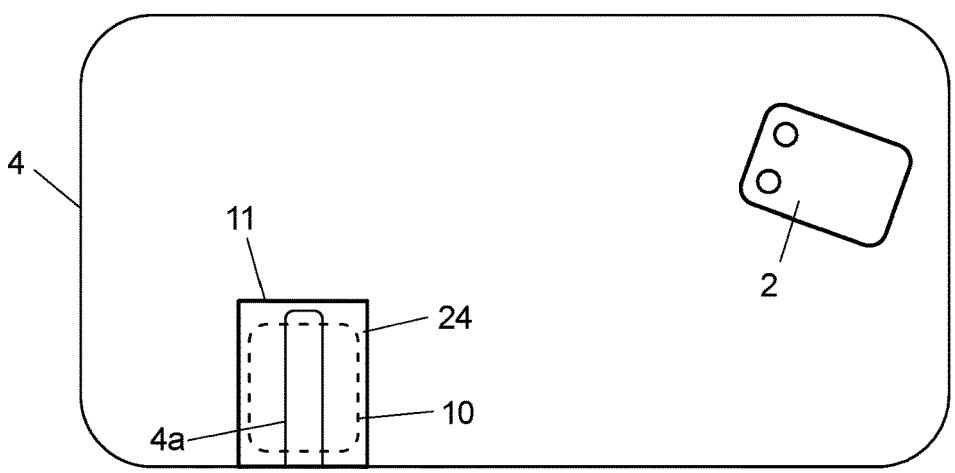
FIG 7.39
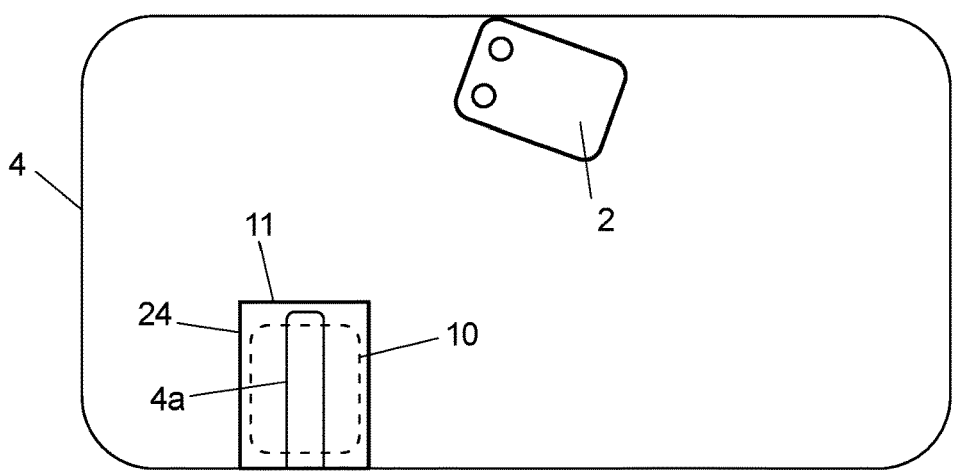

FIG 7.40
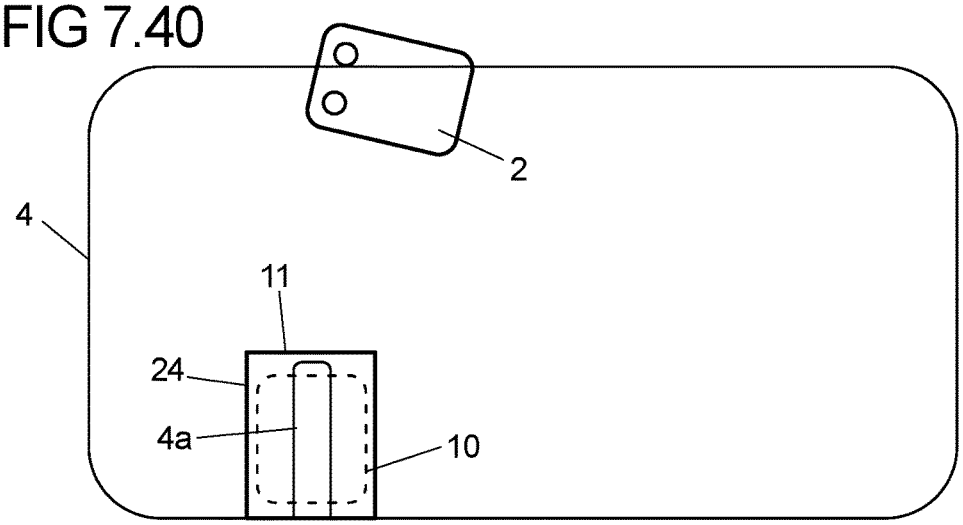
FIG 7.41
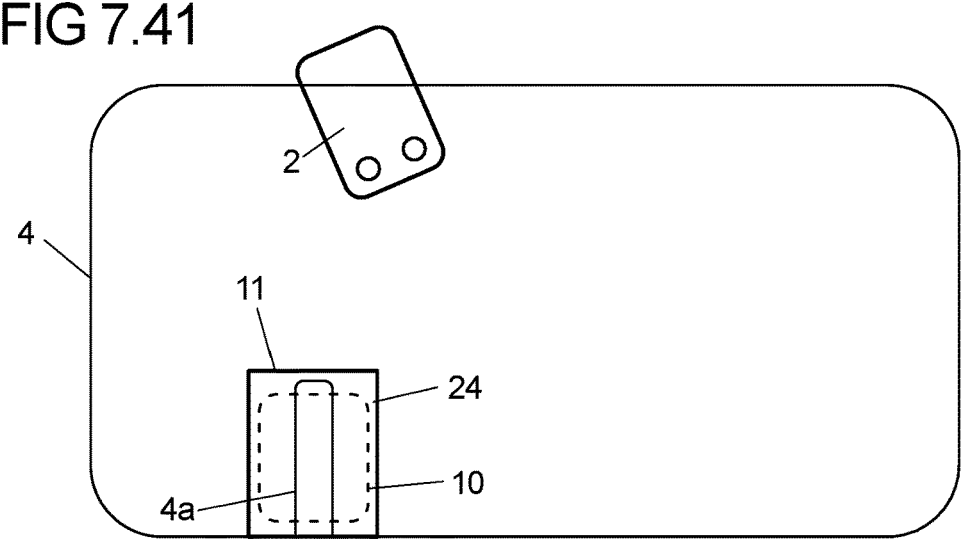
FIG 7.42
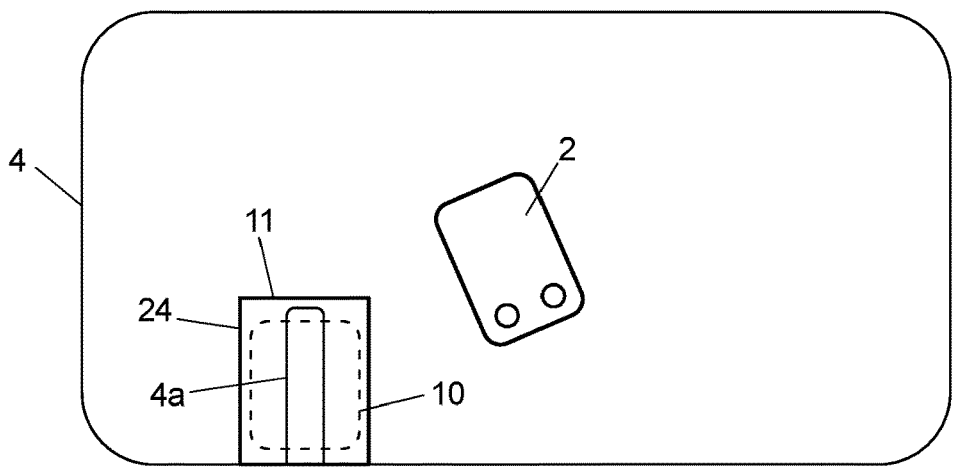

NAVIGATING A ROBOTIC MOWER ALONG A WIRE

TECHNICAL FIELD

The present invention generally relates to a method for navigating a robotic mower along a signal wire, e.g., back to a charging station when a battery of the robotic mower needs to be recharged, or out of the charging station, e.g., when the robotic mower starts mowing after recharging the battery.

BACKGROUND ART

Robotic mowers, also called self-propelled lawnmowers, are generally known. These robotic mowers are provided with a rechargeable battery. When the remaining power in the battery is below a certain level, the robotic mower is programmed to return to the charging station to recharge the battery. There are different possibilities for returning the robotic mower to the charging station. One possible method is that the robotic mower, upon a command to return to the charging station, continues its movement until a boundary wire is detected nearby and then follows the boundary wire to the charging station that is provided somewhere along the boundary wire.

Another option when returning to the charging station is to use a guide wire, which the robotic mower follows back to the charging station. The use of a guide wire may in some situations enable a shorter way back to the charging station compared to following the boundary wire. The guide wire can also be beneficial to use when the robotic mower needs to navigate through a narrow passage. In other situations, the robotic mower may find the boundary wire first, and it can be faster to then follow the boundary wire instead of searching further for the guide wire.

Particularly when exiting and returning to the charging station, it is desirable to reduce tracks formed in the lawn that could be created by driving over the same locations multiple times, and to improve the efficiency of mowing and navigation.

SUMMARY

An object of the present invention is to provide an improved navigation of a robotic mower by means of a wire.

According to an aspect of the present invention this object is achieved by a method for navigating a robotic mower by means of a wire. The robotic mower comprises at least one sensor. The method comprises controlling the robotic mower to exit a parking position at a station, e.g., a charging station. The parking position may be a charging position. For example, in the parking position the robotic mower is at least partially arranged at an inside of a conductive loop of the station, e.g., in a view as seen from above. The loop may be made of a wire but is referred to herein as loop for ease of reference. The method may further comprise determining that the robotic mower has, and thus is, moved further outside of the loop compared to the parking position, e.g., so that it is at least substantially, e.g., at least to a major part, or entirely arranged outside of the loop, e.g., in a view as seen from above, by detecting at least one signal of the loop by means of the at least one sensor, e.g., by detecting that a direction of a vertical magnetic field component of signals of the loop has changed to the opposite direction. The method may comprise detecting at least one signal of said wire by means of the at least one sensor, wherein the wire is different from the loop. The method may comprise controlling the robotic mower to straddle along the wire, e.g., by moving the robotic mower along the wire with a sensor, e.g., the sensor arranged directly over the wire. The steps of the method may be performed in the described order.

This is based on the idea to provide an improved navigation of a robotic mower by means of a wire by efficiently guiding the mower out of the station and to a location where the robotic mower shall start to mow.

The method may further comprise controlling the robotic mower so as to increase the distance between the robotic mower and the wire so that the robotic mower becomes displaced and then is displaced from the wire by a displacement distance. The method may then comprise measuring, by means of the at least one sensor, a signal level of at least one signal from the wire, and controlling the robotic mower to follow the wire based on the measured signal level, e.g., to follow the wire in a distance that maintains the measured signal value at a constant level. This allows to reduce tracks in the lawn efficiently.

According to an exemplary embodiment the displacement distance is based on a random value. For example, the displacement distance is randomly chosen between a minimum displacement distance and a maximum displacement distance. By this, tracks in the lawn may be effectively avoided. The minimum displacement distance and/or the maximum displacement distance may be adjustable by a user. Alternatively or in addition the minimum displacement distance and/or the maximum displacement distance may be based on geometrical properties of the station. The minimum displacement distance may be larger than zero.

Optionally, the method further comprises controlling the robotic mower to return to the station, e.g., when detecting that a battery needs to be recharged.

According to another exemplary embodiment, the method further comprises controlling the robotic mower to follow the wire in the minimum distance when returning to the station, in particular in every return cycle of a plurality of return cycles. By this a very reliable return maneuver is possible with a particularly low risk to miss the station.

According to an exemplary embodiment the method further comprises, in response to determining that the robotic mower has moved further outside of the loop, e.g., is at least substantially arranged outside of the loop, controlling the robotic mower to drive along a straight line for a random distance. This allows to avoid that the mower takes the same subsequent route each exit cycle, so that tracks in the lawn can efficiently be avoided.

According to another exemplary embodiment the wire is a boundary wire delimiting an area. The robotic mower is allowed to navigate within the area, but it is not allowed to exit the area. The boundary wire serves as a boundary for the robotic mower. The station is at least partially arranged in the area so that the robotic mower can enter and exit it when navigating through the area. The area could also be referred to as working area.

According to another exemplary embodiment the method further comprises, after controlling the robotic mower to drive along a straight line for a random distance, controlling the robotic mower to turn by an angle, measuring, by means of the at least one sensor, a signal level of at least one signal from the loop, and/or controlling the robotic mower to follow the loop based on the measured signal level, e.g., until detecting at least one signal from the boundary wire. By this the robotic mower can be steered to drive along an arc or circle with a radius that is defined by the random distance. Therefore, tracks in the vicinity around the station can be effectively reduced or even avoided.

Optionally the method further comprises, before said controlling the robotic mower to increase the distance between the robotic mower and the wire by driving a displacement distance, controlling the robotic mower to straddle along the boundary wire, e.g., by moving along the wire with a sensor directly over the wire, in a first direction until detecting a straight-line section of the boundary wire, and, in response to detecting the straight-line section, controlling the robotic mower to straddle along the boundary wire, e.g., by moving along the wire with a sensor directly over the wire, in a second direction opposite the first direction. This makes it possible to avoid that the robotic mower comes obstacles too close or collides therewith, e.g., at curved sections of the boundary wire. Thus, the robotic mower searches for a straight section for a precise setting of its displacement to the boundary wire.

According to an exemplary embodiment, the wire is a guide wire, e.g., arranged within an area delimited by a boundary wire. The guide wire may lead the robotic mower to the station. The guide wire may connect a, e.g., remote, portion of the area with the station so that the robotic mower can quickly find the station, and/or the guide wire may extend through a narrow passage that the robotic mower might otherwise not be able to find.

Optionally, the method further comprises turning the robotic mower and/or determining the orientation of the robotic mower relative to the guide wire using at least one signal measured by means of each of two sensors. For example, the robotic mower determines the orientation of a vertical component of a magnetic field of the guide wire signal with each of the sensors. If the measured orientation is different between the sensors, the robotic mower may deduce that the guide wire is located between the sensors.

According to an embodiment, the method further comprises, before the step of controlling the robotic mower to increase the distance between the robotic mower and the wire by driving a displacement distance, controlling the robotic mower to straddle along the guide wire, e.g., by moving along the guide wire with a sensor directly over the guide wire, for a predetermined time and/or over a predetermined distance. By this it can be made sure that the displacement from the guide wire is started at a location far enough from the charging station.

The method optionally further comprises measuring a distance and/or driving time driven by the robotic mower, and controlling the robotic mower to abort following the guide or boundary wire when the driven distance equals a preconfigured distance and/or when the driving time equals a preconfigured time. The preconfigured time and/or distance may be a setting adjustable by a user. Thus, the robotic mower may be controlled to navigate to a certain location within the area.

According to an embodiment, the method further comprises, in response to the driven distance equaling the preconfigured distance and/or the driving time equaling the preconfigured time, controlling the robotic mower to mow within the area. By this, a certain location within the area may be mown.

The above object is also achieved by a method for navigating a robotic mower by means of a boundary wire delimiting an area and a loop being at least partially arranged within the area, said robotic mower comprising a first sensor and a second sensor, the method comprising: controlling the robotic mower to follow the boundary wire in a displacement distance using at least one of the sensors, and in response to detecting, by means of the first sensor, that the first sensor is arranged at an inside of the loop, straddling along the loop using the second sensor. This allows a particularly robust navigation towards a parking and/or charging position at the station.

This method may comprise any one or all of the features and/or steps of the method described above.

The method may further comprise detecting, by means of the first sensor, a further wire section. The further wire section may be different from the loop. The further wire section may be at least partially arranged inside the loop. The further wire section may be U-shaped.

According to an embodiment the method further comprises, in response to detecting the further wire section, controlling the robotic mower to drive straight forward for a pre-configured time and/or a pre-configured distance, in particular without following any signal. This allows a particularly robust navigation.

Optionally the further wire section is electrically connected with the boundary wire and/or is a part of the boundary wire. This allows a simple setup.

According to an embodiment the method further comprises controlling the robotic mower to follow the further wire section to assume a parking position in which a battery of the robotic mower is charged by the station.

The above object is also achieved by a method for navigating a robotic mower by means of a wire, said robotic mower comprising at least one sensor, the method comprising: controlling the robotic mower to exit a parking position at a station, e.g. charging station, detecting at least one signal of the wire by means of the at least one sensor, controlling the robotic mower to straddle along the wire, controlling the robotic mower to increase the distance between the robotic mower and the wire so that the robotic mower is displaced from the wire by a displacement distance, measuring, by means of the at least one sensor, a signal level of at least one signal from the wire, and controlling the robotic mower to follow the wire based on the measured signal level. This method may comprise any one or all of the features and/or steps of the methods described above.

According to another aspect the above object is achieved by a robotic mower for navigating by means of a wire and comprising at least one sensor, and adapted to: exit a parking position at a station, wherein in the parking position the robotic mower is at least partially arranged at an inside of a loop of the station, determine that the robotic mower is at least substantially arranged outside of the loop by detecting at least one signal of the loop by means of the at least one sensor, detect at least one signal of the wire by means of the at least one sensor, straddle along the wire, increase the distance between the robotic mower and the wire so that the robotic mower is displaced from the wire by a displacement distance, measure, by means of the at least one sensor, a signal level of at least one signal from the wire, and follow the wire based on the measured signal level.

The above object is achieved by a robotic mower for navigating by means of a boundary wire delimiting an area and a loop being at least partially arranged within the area, the robotic mower comprising a first sensor and a second sensor, and adapted to: follow the boundary wire in a displacement distance using at least one of the sensors, and in response to detecting, by means of the first sensor, that the first sensor is arranged at an inside of the loop, straddle along the loop using the second sensor.

The above object is achieved by a robotic mower for navigating by means of a wire and comprising at least one sensor, and adapted to: exit a parking position at a station, detect at least one signal of the wire by means of the at least one sensor, straddle along the wire, increase the distance between the robotic mower and the wire so that the robotic mower is displaced from the wire by a displacement distance, measure, by means of the at least one sensor, a signal level of at least one signal from the wire, and follow the wire based on the measured signal level.

Optionally, the robotic mower of any aspect described herein is adapted to perform the method of any aspect or embodiment described herein.

According to an aspect, a system comprising a wire and the robotic mower according to any aspect or embodiment described herein is provided. Therein, the wire may be a guide wire arranged within an area delimited by a boundary wire, or the boundary wire.

By this, a method, robotic mower and system for navigating the robotic mower by means of a wire are provided that allow an improved navigation of the robotic mower by means of the wire.

BRIEF DESCRIPTION OF DRAWINGS

The invention is now described, by way of example, with reference to the accompanying drawings, in which:

FIG. 1 is a schematic view of a robotic mower system.

FIG. 2 is a schematic view of an exemplary embodiment of the robotic mower.

FIG. 3 is a schematic view of an exemplary embodiment of a charging station of the robotic mower system.

FIG. 4 is a schematic block diagram of a control unit in the robotic mower.

FIG. 5 is a schematic block diagram of a signal generator.

FIG. 6.1 to FIG. 6.22 show different steps when the robotic mower navigates along a guide wire of the robotic mower system.

FIG. 7.1 to FIG. 7.42 show different steps when the robotic mower navigates along a boundary wire of the robotic mower system.

DESCRIPTION OF EMBODIMENTS

In the following, a detailed description of exemplary embodiments for navigating a robotic mower by means of a wire according to the present disclosure will be presented.

FIG. 1 shows a schematic overview of a system for performing the method of embodiments for navigating a robotic mower 2 by means of a guide wire 8, in particular towards and away from a predetermined position, such as a charging station 11. The robotic mower 2, or as it also may be called a self-propelling lawnmower, is battery powered and needs to be recharged at regular intervals. The robotic mower 2 is during operation configured to move across an area A surrounded by a boundary wire 4. As is obvious the robotic mower 2 is depicted somewhat enlarged for the sake of clarity. The boundary wire 4 may be configured in many different ways, such that it delimits the area A within which the robotic mower 2 is allowed to move. The boundary wire 4 is preferably provided under the ground in the lawn, such that is not visible, but may also be provided on or above the ground. The boundary wire 4 could be an ordinary copper wire of single-core type. There are of course also other options, which are well-known by a person skilled in the art, such as multi stranded wire types. As may be seen in FIG. 1 the boundary wire 4 makes a loop 4a in the charging station 11. This loop 4a will be used to guide the robotic mower 2 into charging contact with the charging station 11, which will be described further below.

The system also comprises the charging station 11 mentioned above. The charging station itself 11 may be seen as the place where the charging of the robotic mower 2 takes place, and could for an example be provided with a charging station plate 24 onto which the robotic mower 2 is guided when performing docketing. A charging station plate 24 will make the docketing process more precise, since the robotic mower 2 will be at an even and predictable ground during the docketing process. Further, there is provided a charging station loop 10 at the charging station 11. As shown in FIG. 1 the boundary wire loop 4a is narrower than and, optionally crosses the charging station loop 10. The charging station loop 10 is entirely arranged at the charging station 11, more specifically, mounted on the charging station plate 24. The charging station loop 10 thus has an extension that is smaller, or at most as large as, the charging station 11. The charging station loop 10 transmits signals that are different from signals that the boundary wire 4 transmits. Thus, the robotic mower 2 can differentiate between the charging station loop 10 and the boundary wire 4.

A system according to the present disclosure may also comprise one or more guide wires 8. A guide wire 8 is a wire that the robotic mower 2 may follow when returning to the charging station 11, when exiting the charging station 11 to start a mowing cycle and/or to move along a way that is otherwise difficult to find. This will be described in more detail with reference to FIGS. 6.1 to 6.22. The robotic mower may also be adapted to follow the boundary wire 4 back to the charging station 11 and/or to exit the charging station to start a mowing cycle, as will be described in more detail with reference to FIGS. 7.1 to 7.42.

The boundary wire 4, the charging station loop 10 and the one or more guide wires 8 are all connected to a signal generator which feeds each wire and loop with a, particularly wire-specific, current signal, in particular an Alternating Current, AC, signal, such that the robotic mower 2 may recognize which wire or loop it is detecting when it is within sensing distance. In general, the robotic mower 2 may be adapted to detect magnetic fields of the different signal wires.

Turning now to FIG. 2, an exemplary embodiment of the robotic mower 2 will be closer described. The robotic mower 2 comprises a control unit 22, wheels 20, at least one sensor 12, 14, in particular two sensors 12, 14, optionally three or four sensors 12, 14, 12', 14', e.g., two sensors 12, 14 at the front and one or two sensors 12', 14' at the back, and a battery 18. The sensors 12, 14, 12', 14' each are adapted to sense magnetic fields. In the present example, the robotic mower 2 comprises exactly two sensors 12, 14, but, as said, in alternative embodiments the robotic mower 2 may comprise more than two, e.g., three or four sensors. The control unit 22, which will be closer described in conjunction with FIG. 4, comprises a processor 80 for controlling the movement of the robotic mower 2. When the robotic mower 2 is in operation, the sensors 12, 14 can sense a magnetic field that is generated in the boundary wire 4, the charging station loop 10 and the one or several guide wires 8. The signals of the different wires 4, 8 and loop 10 may be encoded differently. The sensed magnetic field, i.e. signal, is decoded in the control unit 22 to determine from which loop or wire it was received. The robotic mower 2 further comprises charging connectors 16.

It is worth noting that the robotic mower 2 has a forward-rearward axis along which the robotic mower 2 moves when it drives straight ahead or straight backwards. In the present example, the robotic mower 2 has a longitudinal extension in accordance with the forward-rearward axis. The two sensors 12, 14 are arranged displaced to one another in a direction orthogonal to the forward-rearward axis. In this example, the sensors 12, 14 are arranged in a front region of the robotic mower 2 and could be referred to as front sensors 12, 14. Two rear sensors 12', 14' are optionally provided at the rear of the robotic mower 2 and arranged displaced to one another in a direction orthogonal to the forward-rearward axis.

FIG. 3 shows an exemplary embodiment of the charging station 11. The charging station 11 comprises the charging station plate 24 at which the charging station loop 10, which can also be referred to as far-field loop, and the boundary wire loop 4a, which may also be referred to as near-field loop, are arranged. The charging station 11 further comprises the signal generator 6. As shown in FIG. 3, the charging station 11 comprises charging connectors 26 which are arranged so as to be contacted by the charging connectors 16 of the robotic mower 2 when docking into the charging station 11. The charging connectors 26 are mounted on a tower 28 of the charging station 11. When the charging station 11 is placed on the ground so that the robotic mower 2 can enter the charging station 11 by driving on the charging station plate 24, the tower 28 is higher than the charging station plate 24, i.e., the tower 28 has a larger vertical extension than the charging station plate 24. Optionally, the signal generator 6 is arranged in the tower 28.

With reference to FIG. 4, the control unit 22 of the robotic mower 2 will be closer described. The control unit 22 comprises, as mentioned above, the processor 80 and a memory 82. The memory 82 may comprise a computer program 84 comprising computer program code, i.e. instructions. The computer program code is adapted to implement method steps performed by the robotic mower 2 when the code is executed on the processor 80. The control unit 22 further comprises an interface 86 for communication with the sensors 12, 14, and one or more motors that operate(s) the robotic mower 2.

The processor 80 may comprise a single Central Processing Unit (CPU), or could comprise two or more processing units. For example, the processor 80 may include general purpose microprocessors, instruction set processors and/or related chips sets and/or special purpose microprocessors such as Application Specific Integrated Circuits (ASICs), Field Programmable Gate Arrays (FPGAs) or Complex Programmable Logic Devices (CPLDs). The processor 80 may also comprise a storage for caching purposes.

FIG. 5 depicts the signal generator 6, which also comprises a processor 60 and a memory 62. The memory 62 may comprise a computer program 64 comprising computer program code, i.e. instructions. The computer program code is adapted to implement method steps performed by the signal generator 6 when the code is executed on the processor 60. The signal generator 6 further comprises an interface 66 for transmitting the generated (e.g., AC) signals to the boundary wire 4, charging station loop 10 and guide wire or wires 8.

The processor 80, 60 may comprise a single Central Processing Unit (CPU), or could comprise two or more processing units. For example, the processor 60 may include general purpose microprocessors, instruction set processors and/or related chips sets and/or special purpose microprocessors such as Application Specific Integrated Circuits (ASICs), Field Programmable Gate Arrays (FPGAs) or Complex Programmable Logic Devices (CPLDs). The processor 60 may also comprise a storage for caching purposes.

Turning now to FIG. 6.1 to FIG. 6.22 an exemplary embodiment will be closer described.

Firstly, a command is triggered, indicating that the robotic mower 2 shall be navigated towards a predetermined position, in the present example the charging station 11. The command may be triggered by the signal generator 6, or by the control unit 22. The robotic mower 2 then starts to search for the guide wire 8. For finding the guide wire 8, the robotic mower 2 drives across the area A and the sensors 12, 14 are used to listen for guide wire 8 signals. The guide wire 8 signals have a range, e.g. of several meters, within which the sensors 12, 14 can sense the signals. As soon as one or both of the sensors 12, 14 receive the guide wire 8 signals, the robotic mower 2 is commanded to drive to the guide wire 8, e.g., simply by continuing to drive straight until the robotic mower 2 crosses the guide wire 8.

To create the guide wire 8 signals, the signal generator 6 directs current through the guide wire 8 which creates a magnetic field around the guide wire 8 having a polarity. Thus, on one side of the guide wire 8, the polarity of the guide wire 8 signal, is opposite to the polarity at the other side of the guide wire 8, e.g., when a vertical component thereof is measured. As soon as the robotic mower 2 crosses the guide wire 8, one or both of the sensors 12, 14 detect a change of the polarity. By detecting this change, the robotic mower 2, more precisely, its control unit 22, is configured to determine that it crosses the guide wire 8.

FIG. 6.1 shows a situation where the robotic mower 2 detects the guide wire 8. A first sensor 12 of the sensors 12, 14 has crossed the guide wire 8 while the other has not, so the robotic mower 2 can deduce that it is located directly above the guide wire 8.

In the present example, the robotic mower 2 arrived at the guide wire 8 at an angle, and in the situation shown in FIG. 6.1, the first sensor 12 has crossed the guide wire 8 while the other, second sensor 14 of the sensors 12, 14 has not yet crossed it. By measuring the guide wire 8 signal polarity with the sensors 12, 14, e.g., by measuring a vertical component of the guide wire 8 signal magnetic field, the robotic mower 2 determines that it is directly above the guide wire 8. When the robotic mower 2 would arrive at the guide wire 8 orthogonally thereto, both sensors 12, 14 would detect a switch of the polarity at the same time, so the robotic mower 2 could deduce that it is directly above the guide wire 8 in that situation.

Further, the guide wire 8 is electrically connected to the signal generator 6 with one end, and to the boundary wire 4 with another end, wherein the boundary wire 4 is connected to the signal generator 6. By determining the polarity of the guide wire 8 signals, the robotic mower 2 is able to deduce on which side of the guide wire 8 the corresponding sensor 12, 14 is located. Further, depending on whether both sensors are left or right of the guide wire 8, or one is left and the other is right (or vice versa) the robotic mower 2 can deduce whether it is oriented along the guide wire 8 towards the charging station 11 or away from the charging station 11, or facing left or right with respect to the guide wire 8. Thus, by a simple and very robust measurement of two polarity signals, the robotic mower 2 can quickly and reliably determine its current orientation with respect to the guide wire 8 and the charging station 11.

As shown in FIG. 6.2, in response to detecting that it is located above the guide wire 8, the robotic mower 2 is adapted to drive further (in particular, straight ahead) across the guide wire 8 for a predefined distance. The predefined distance may be the length of the mower or a fraction thereof, or the turning radius of the robotic mower 2 or a fraction thereof. After driving the predefined distance, both sensors 12, 14 are arranged at the same side of the guide wire 8. Based on the guide wire 8 signal polarity, the robotic mower 2 determines the direction along the guide wire 8 to the charging station 11. Next, the robotic mower 2 turns left or right towards this determined direction of the charging station 11. While rotating relative to the guide wire 8, the robotic mower 2 analyzes the guide wire 8 signal polarity. As soon as one of the sensors 12, 14, in the figures, the left, second sensor 14, detects a change of the polarity, the robotic mower 2 determines that the guide wire 8 is substantially aligned with the robotic mower 2, in the present example, aligned with the forward-rearward axis of the robotic mower 2.

In other words, the robotic mower 2 may use two front sensors 12, 14 to determine in which direction to follow the guide wire 8 in order to reach the charging station 11, or in order to drive away from the charging station 11 as will be described in more detail with reference to FIGS. 6.10 to 6.22. Depending on the polarity of the signal from the guide wire 8, the robotic mower 2 can distinguish if the charging station 11 is located behind, to the left, to the right or in front of the robotic mower 2. The alignment towards the charging station 11 can be used as a trigger point for when to start following the guide wire 8. Further, different actions can be taken by the robotic mower 2 to optimize the alignment process using this information, such as turning different angles and/or turning with different speeds, e.g., turning with a speed and/or by an angle depending on the determined direction. Further, a fault detection after crossing the guide wire 8 may be provided. For example, if the alignment is undefined, the robotic mower 2 can abort the alignment procedure and restart a new search for the guide wire 8 immediately, instead of trying for some time to figure out a solution or trying to locate the guide wire 8. For comparison, a conventional robotic mower would have to turn large angles until a front sensor crosses the wire again to determine its relative position to the wire. The reason for the large angles is because of an inherent risk of slipping on the grass, and therefore the conventional mower may continue to turn until finally giving up. The methods described herein allow to perform calculated actions, thus reducing unnecessary search time and therefore improving battery life.

FIG. 6.3 shows the robotic mower 2 after aligning with the guide wire 8. The robotic mower 2 now faces the direction along the guide wire 8 towards the charging station 11.

Next, as shown in FIG. 6.4, the robotic mower 2 navigates, by means of the sensors 12, 14 detecting signal of the guide wire 8, such that one sensor, here, the first, right-hand side sensor 12 is located directly above the guide wire 8.

Then, the robotic mower 2 starts to straddle the guide wire 8 with one of the sensors 12, 14 directly above the guide wire 8 towards the charging station 11. In the present example, this is the right-hand side sensor 12. The other sensor 14, here, as an example, the left-hand side sensor, is the one outside the guide loop, with in the figures is below the guide wire 8. While straddling along the guide wire 8, the robotic mower 2 maintains the same distance to the guide wire 8. Straddling may be performed by steering the robotic mower 2 such that the sensor is arranged directly over the respective wire or loop, e.g., by monitoring the signal polarity.

FIGS. 6.5, 6.6 and 6.7 show the robotic mower 2 after straddling along the guide wire 8 portions of its way to the charging station 11.

Next, the robotic mower 2 detects that one or both of the sensors 12, 14 has/have entered the charging station loop 10 by detecting a change of the measured charging station loop 10 signal polarity, see FIG. 6.8.

In response to detecting entering of the charging station loop 10, the robotic mower 2 continues to drive straight forward for a predetermined distance.

Next, the robotic mower 2 localizes itself in relation to the near-field loop, in this example the boundary wire loop 4a. The boundary wire loop 4a is a fixed part of the boundary wire 4 and contains the same signal as the boundary wire 4. In order to determine its orientation in relation to the boundary wire loop 4a, the robotic mower 2 turns until one of the front sensors 12, 14 enters the boundary wire loop 4a. When one of the front sensors 12, 14 enters the boundary wire loop 4a or is already inside the boundary wire loop 4a, the robotic mower 2 continues to turn until the trailing sensor 12, 14 also enters the boundary wire loop 4a. If one sensor 12, 14 enters the boundary wire loop 4a first, the trailing sensor is the other one of the sensors 12, 14.

The near-field alignment which the robotic mower 2 is configured to perform may also include fault handling to detect if the robotic mower 2 is initially turning in the wrong direction, by, for example, using a maximum turning angle without detecting the boundary wire loop 4a with any of the front sensors 12, 14 before turning in the other direction. This fault detection is only used if no loop signal would be inside the boundary wire loop 4a before the initial turning. If a sensor 12, 14 is inside of the boundary wire loop 4a, the robotic mower 2 can deduce which direction to turn.

FIG. 6.9 shows the robotic mower 2 after having initially aligned with the boundary wire loop 4a. Next, the robotic mower 2 continues with the docking procedure. The robotic mower 2 drives (slowly) forward and depending on the sensor 12, 14 information about the boundary wire loop 4a signal (in general, near-field signal) either turns slightly left or right. Optionally, the following procedure is used: (a) if the left sensor 14 is inside the boundary wire loop 4a and the right sensor 12 is outside of the boundary wire loop 4a, the robotic mower 2 turns left, e.g., using a turning velocity (and/or time) that depends on the boundary wire loop 4a signal level measured by the left sensor 14; (b) if the right sensor 12 is inside the boundary wire loop 4a and the left sensor 12 is outside of the boundary wire loop 4a, the robotic mower 2 turns right, e.g., using a turning velocity (and/or time) that depends on the boundary wire loop 4a signal level measured by the right sensor 12; (c) if no sensor 12, 14 is inside the boundary wire loop 4a, or both sensors 12, 14 are inside the boundary wire loop 4a, then the robotic mower 2 drives straight forward without turning. Steps (a) to (c) may be performed continuously until the robotic mower 2 reaches the charging position where the charging connectors 16 of the robotic mower 2 make electric contact with the charging connectors 26 of the charging station 11.

FIG. 6.10 shows the robotic mower 2 in the charging position. In this position, the charging station 11 may charge the battery 18 of the robotic mower 2. It is worth noting that instead of a charging station 11, a different kind of a station could be used, so that the charging position could be referred to more generally as parking position.

When the battery 18 of the robotic mower 2 has been charged and/or when another condition is fulfilled, e.g., at a specific time and/or day, the robotic mower 2 exits the charging station 11 to start a mowing cycle. It might be necessary to mow a particular portion of the area A. To navigate the robotic mower 2, the robotic mower 2 may be commanded, e.g., by a user, by the charging station 11 and/or by the robotic mower 2, to follow the guide wire 8 out of the charging station for a preconfigured distance. Optionally, various profiles may be stored that comprise different values for the preconfigured distance. To name just an example, the robotic mower 2 may be controlled to follow the guide wire 8 for a first preconfigured distance, e.g., 50 m, in a first mowing cycle, e.g., on Monday, and to follow the guide wire 8 for a second preconfigured distance, e.g., 100 m, in a second mowing cycle, e.g., on Tuesday.

While being arranged in the charging position, the robotic mower 2 is at least partially arranged within the charging station loop 11 in a view seen from above. The robotic mower 2 drives straight backwards. At the same time, the robotic mower 2 checks the polarity of the charging station loop 10 signals, e.g., by measuring the vertical signal component. When the sensors 12, 14 detect that the polarity of both sensors 12, 14, or alternatively of one of the sensors 12, 14, changes to the opposite direction, the robotic mower 2 deduces that the sensors 12, 14, and at least its major part, are/is arranged outside of the charging station loop 10 and of the charging station 11, see FIG. 6.11.

Next, the robotic mower 2 continues to drive straight backwards for an additional, random distance, see FIG. 6.12.

When the random distance is reached, the robotic mower 2 stops and determines where the guide wire 8 is located in relation to the mower using the polarity measured by each of the sensors 12, 14. In FIG. 6.12 the guide wire 8 signal polarities measured by the sensors 12, 14 indicate that the robotic mower 2 is oriented towards the charging station 11. Next, the robotic mower 2 will turn in one direction, e.g., to the left to a maximum angle, e.g., of 270 degrees, until the sensors 12, 14 are on opposite sides of the guide wire 8 and thus detect opposite polarities, see FIGS. 6.13, 6.14 and 6.15.

At FIG. 6.15, the sensors 12, 14 are on the opposite sides of the guide wire 8 and the robotic mower 2 determines that it is oriented out from the charging station 11, i.e., in the correct way when exiting it. At this point, the robotic mower 2 starts to measure its travel distance, e.g., by means of odometry.

Next, the robotic mower 2 starts to straddle the guide wire 8 for a preconfigured time and/or distance, e.g., by driving along the guide wire 8 with one of the sensors 12, 14, e.g., the left sensor 14, directly above the guide wire 8, e.g., using the guide wire 8 signal polarity, see FIG. 6.16.

After the preconfigured time has been elapsed and/or a preconfigured distance has been driven by the robotic mower 2, the robotic mower 2 stops, see FIG. 6.17.

Next, the mower turns in one direction, e.g., to the right, away from the guide wire 8, e.g., until the distance between the guide wire 8 and one of the sensors 12, 14, e.g., the left sensor 14, is the same as a random corridor distance, see FIG. 6.18.

Then, the robotic mower 2 samples the current signal amplitude from the guide wire 8 with the sensor 12, 14 it will use when following the guide wire 8, e.g., the left sensor 14, and starts to follow the guide wire 8 using this signal amplitude, see FIGS. 6.19, 6.20 and 6.21.

As shown in FIG. 6.21, when the robotic mower 2 detects that it has driven the preconfigured distance, the robotic mower 2 stops.

Next, the robotic mower 2 turns a random angle and starts a mowing cycle, see FIG. 6.22. If not yet activated, the robotic mower 2 starts a rotation of a cutting blade.

Turning now to FIGS. 7.1 to 7.42, an operation of the robotic mower 2 to return to the charge station 11, and to exit the charging station 11 will be described in more detail.

Starting with FIG. 7.1, the robotic mower 2 starts to return to the charging station 11, e.g., to recharge the battery as described above. First, the robotic mower 2 detects the boundary wire 4, e.g., by detecting a change of the direction of the polarity of the boundary wire 4 signals, e.g., by measuring the vertical magnetic field component of the signals using the sensors 12, 14. Alternatively, the boundary wire 4 may be detected as described with reference to the guide wire 8 above.

Returning by means of the boundary wire 4 may be initiated directly upon detection of the boundary wire 4. Alternatively, the robotic mower may be configured or configurable to return by means of the boundary wire 4 in case that it finds the boundary wire 4 before it finds the guide wire 8 and/or when no guide wire 8 is installed and/or when the guide wire 8 has not been found after searching for it for a preconfigured time.

Next, as shown in FIG. 7.2, the robotic mower 2 straddles along the boundary wire 4, e.g., by following the boundary wire 4 with one of the sensors 12, 14 directly over the boundary wire 4. For example, the robotic mower 2 is adapted to straddle along the boundary wire 4 using the left sensor 14 when straddling along the boundary wire 4 in clockwise direction. Alternatively or in addition the robotic mower 2 is adapted to straddle along the boundary wire 4 in the counter-clockwise direction, and to use the right sensor 12 in that case.

The robotic mower 2 searches for a straight section of the boundary wire 4. When the robotic mower 2 found a straight section, e.g., with a preconfigured length, then it stops.

Next, the robotic mower 2 drives straight backwards, e.g., for a distance corresponding to a predetermined factor times a predetermined, fixed corridor distance, see FIG. 7.3. Then, the robotic mower 2 determines and records the signal level of the boundary wire signals using the sensor 12 that is farthest away from the boundary wire 4 as a reference.

Then, the robotic mower 2 turns towards the area A by a predetermined angle, e.g., 45 degrees, see FIG. 7.4.

As a next step, the robotic mower 2 drives straight forward for a predetermined distance, e.g., a predetermined factor, e.g., 1.41, times the fixed corridor distance in order to assume a distance to the boundary wire 4, see FIG. 7.5. By this, collisions with obstacles near the boundary wire 4 can be avoided.

Next, the robotic mower 2 turns the same angle as before, e.g., 45 degrees, but in the opposite direction, see FIG. 7.6. Thus, now the robotic mower 2 is placed in parallel to and displaced to the boundary wire 4. Then, the robotic mower 2 determines the signal level of the boundary wire 4 signals, e.g., with the same sensor as before, and starts to follow the boundary wire 4 at this signal level, see FIG. 7.7.

As shown in FIG. 7.8, the robotic mower 2 detects the far-field signal of the charging station loop 10 at a predetermined distance. Next, the robotic mower 2 continues to follow the boundary 4 wire as shown in FIGS. 7.6 to 7.8, see FIG. 7.9.

Next, the robotic mower 2 continues following the boundary wire 4 until it enters the charging station loop 10, e.g., as seen from above, with the sensor 14 closest to the boundary wire 4, in this case, the left sensor 14, see FIG. 7.10. For example, entering the charging station loop 10 is detected by measuring a flipping vertical charging station loop 10 signal magnetic field component.

Then, the robotic mower 2 starts straddling the charging station loop 10 with the sensor 12 farthest away from the boundary wire 4, in this case the right sensor 12, see FIG. 7.11. So, while entering the charging station loop 10 is detected with a first sensor 14, straddling is performed with another, second sensor 12.

Then, the robotic mower 2 continues straddling along the charging station loop 10 with the second sensor 12, and detects, e.g., by measuring a change of the polarity, that the first sensor 14 is arranged outside of the boundary wire 4 area A, i.e., inside the U-shaped boundary wire loop 4a section at the charging station 11, see FIG. 7.12.

Afterwards, the robotic mower 2 continues straddling along the charging station loop 10 with the second sensor 12 until the first sensor 14 returns to the inside of the boundary wire 4 area A, see FIG. 7.13.

The robotic mower 2 then starts to run straight forward, e.g., without following any signal, for a preconfigured time and/or distance. It stops after that, see FIG. 7.14. in this position, the back wheel of the robotic mower 2 is arranged on the charging station plate 24 center. Like this it can be avoided to hit the tower 28.

Then, the robotic mower 2 turns by 90 degrees away from the charging connectors 26 of the charging station 11, see FIG. 7.15.

Next, the robotic mower 2 drives straight forward for a preconfigured distance, see FIG. 7.16, and turns until the trailing sensor, wherein trailing refers to the turning, is arranged at an outside of the boundary wire 4, i.e., inside of the U formed by the boundary wire loop 4a, see FIG. 7.17. Optionally, this turning is restricted to a maximum of 270 degrees. After that, the robotic mower 2 assumes the charging position 10 as described above with reference to FIGS. 6.9 and 6.10, see FIG. 7.18.

When in the charging position and for example for the reasons set forth above with respect to the guide wire 8, the robotic mower 2 may exit and leave the charging station 11 using the boundary wire described in the following.

First, the robotic mower 2 starts to exit the charging station 2 and drives straight backwards, see FIG. 7.19. When the robotic mower 2 detects that it has left the charging station 11, e.g., by determining that the front sensors 12, 14 get outside of the charging station loop 10, e.g., by measuring the signal vertical component polarity, it continues to drive straight backwards for a random distance. After that the robotic mower 2 stops, see FIG. 7.20.

Next, the robotic mower 2 turns by an angle, e.g., a predetermined angle, e.g., 45 degrees, to the left or to the right, see FIG. 7.21. The turning direction may be preconfigured or preconfigurable, or it may be selected depending on the lawn and/or on a schedule, e.g., time of the day, day of the week or similar. For example, several profiles with different directions may be stored together with probabilities to select the individual profiles, wherein the profile to perform is chosen, e.g. randomly, based on these probabilities. The schedule or profiles may also comprise a total driving distance. At this point, the robotic mower 2 starts to measure the driven distance, e.g., using odometry.

Next, the robotic mower 2 determines and records the current signal level detected from the charging station loop 10 signals with one of the front sensors 12, 14, and starts to follow the charging station loop 10 at this signal level with this sensor 12, 14, see FIGS. 7.22 to 7.26.

Then, as shown in FIG. 7.26, one of the front sensors 12, 14 gets outside of the boundary wire 4 area A, e.g., detected by measuring the polarity of the vertical signal component. When this is the case, the robotic mower 2 stops.

The robotic mower 2 then turns in the same direction as after exiting the charging station backwards, until the trailing sensor 12 returns to the inside of the boundary wire 4 area A, see FIG. 7.27. Next, the robotic mower 2 starts straddling along the boundary wire 4 with that sensor 12 for a preconfigured time or until it finds a straight boundary wire 4 section, see FIG. 7.28.

When the robotic mower 2 found a straight section, e.g., of a certain length, it stops, see FIG. 7.29, and drives straight backwards, e.g., for a predetermined factor times of a random corridor distance. Then it stops, see FIG. 7.30. Optionally, the certain length of the straight section may also be determined based on the random corridor distance. The random corridor distance may be a random value between a minimum corridor distance and a maximum corridor distance. Therein, the minimum corridor distance may approximately correspond to the width of the tower 28 measured in the entry-exit direction of the robotic mower 2. The maximum corridor distance may depend on the width of the charging station 11 measured in the entry-exit direction and/or on the width of the charging station loop 10. It is worth noting that for returning to the charging station 11 along the boundary wire 4, always the minimum corridor distance is used. This increases the chances to find the charging station 11 and not miss it.

Next, the robotic mower 2 turns by an angle, e.g., 45 degrees, towards the inside of the boundary wire 4 area A, see FIG. 7.31. Then the robotic mower 2 drives straight forward for a predetermined factor, e.g., 1.41, times the random corridor distance, see FIG. 7.32. Then the robotic mower 2 turns back the same angle as before, e.g., 45 degrees, but in the opposite direction.

The robotic mower 2 then measures and records the signal level of the boundary wire 4 signals with one of the sensors 12, 14, and starts to follow the boundary wire 4 at this signal level, see FIGS. 7.33 to 7.37. Here, the left or right sensor may be used, e.g., based on the distance to the boundary wire 4, e.g., determined by comparing the signal level. Optionally, a sensor that is closer to the boundary wire 4 than a predetermined distance is not used to follow the boundary wire 4 at the signal level. By this it can be avoided that the used sensor crosses the boundary wire 4 what would lead to signal polarity flips which would be difficult to interpret for the robotic mower 2.

When the robotic mower 2 then detects that the total driven distance is the same as the preconfigured or preconfigurable total driving distance, it will stop following the boundary wire 4 out and start a cutting cycle, see FIGS. 7.38 to 7.42. In the cutting cycle the robotic mower 2 motion may be randomized.

It is worth noting that a robotic mower 2 may be adapted to operate in accordance with some or all of the steps described with reference to FIGS. 6.1 to 6.10 and/or to operate in accordance with some or all of the steps described with reference to FIGS. 6.10 to 6.22 and/or to operate in accordance with some or all of the steps described with reference to FIGS. 7.1 to 7.18 and/or to operate in accordance with some or all of the steps described with reference to FIGS. 7.18 to 7.42. The same holds for a corresponding method for navigating a robotic mower.

Although, the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Furthermore, although individually listed, a plurality of means or elements may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second"

etc. do not preclude a plurality. Reference signs in the claims are provided merely as a clarifying example and shall not be construed as limiting the scope of the claims in any way.

LIST OF REFERENCE NUMERALS 2 robotic mower
4 boundary wire
4a boundary wire loop (wire section)
6 signal generator
8 guide wire
10 charging station loop
11 charging station
12, 12' sensor
14, 14' sensor
16 charging connector
18 battery
20 wheel
22 control unit
24 charging station plate
26 charging connector
28 tower
60 processor
62 memory
64 computer program
80 processor
82 memory
84 computer program
A area

The invention claimed is:

1. A method for navigating a robotic mower (2) by a wire (4, 8), said robotic mower (2) comprising at least one sensor (12; 14), the method comprising:
controlling the robotic mower (2) to exit a parking position at a station (11), wherein in the parking position the robotic mower (2) is at least partially arranged at an inside of a loop (10) of the station (11),
determining that the robotic mower (2) has moved further outside of the loop (10) by detecting at least one signal of the loop (10) by the at least one sensor (12, 14),
detecting at least one signal of the wire (4, 8) by the at least one sensor (12, 14) and
controlling the robotic mower (2) to straddle along the wire (4, 8).

2. The method according to claim 1, further comprising:
controlling the robotic mower (2) to increase the distance between the robotic mower (2) and the wire (4, 8) so that the robotic mower (2) is displaced from the wire (4, 8) by a displacement distance,
measuring, by the at least one sensor (12, 14), a signal level of at least one signal from the wire (4, 8), and
controlling the robotic mower (2) to follow the wire (4, 8) based on the measured signal level.

3. The method according to claim 2, wherein the displacement distance is randomly determined between a minimum displacement distance and a maximum displacement distance.

4. The method according to claim 3, further comprising controlling the robotic mower (2) to return to the station (11).

5. The method according to claim 3, further comprising controlling the robotic mower (2) to return to the station (11), and controlling the robotic mower (2) to follow the wire (4, 8) in the minimum distance when returning to the station (11).

6. The method according to claim 5, further comprising, in response to determining that the robotic mower (2) has moved further outside of the loop (10), controlling the robotic mower (2) to drive along a straight line for a random distance.

7. The method according to claim 6, wherein the wire (4) is a boundary wire delimiting an area (A).

8. The method according to claim 7, further comprising, after controlling the robotic mower (2) to drive along a straight line for a random distance, controlling the robotic mower (2) to turn by an angle, measuring, by the at least one sensor (12, 14), a signal level of at least one signal from the loop (10), and controlling the robotic mower (2) to follow the loop (10) based on the measured signal level until detecting at least one signal from the boundary wire (4).

9. The method according to claim 8, wherein the wire (4) is a boundary wire delimiting an area (A), further comprising, before controlling the robotic mower (2) to increase the distance between the robotic mower (2) and the boundary wire (4) by driving a displacement distance, controlling the robotic mower (2) to straddle along the boundary wire (4) in a first direction until detecting a straight section of the boundary wire (4), and, in response to detecting the straight section, controlling the robotic mower (2) to straddle along the boundary wire (4) in a second direction opposite the first direction before.

10. The method according to claim 6, wherein the wire (8) is a guide wire arranged within an area (A) delimited by a boundary wire (4).

11. The method according to claim 10, further comprising turning the robotic mower (2) and determining the orientation of the robotic mower (2) relative to the guide wire (8) using at least one signal measured by each of two sensors (12, 14) of the robotic mower (2).

12. The method according to claim 11, further comprising, before controlling the robotic mower (2) to increase the distance between the robotic mower (2) and the guide wire (8) by driving a displacement distance, controlling the robotic mower (2) to straddle along the guide wire (8) for a predetermined time or over a predetermined distance.

13. The method according to claim 12, further comprising measuring a distance driven by the robotic mower (2), and controlling the robotic mower (2) to abort following the wire (4, 8) when the driven distance equals a preconfigured distance and/or when a driving time equals a preconfigured time.

14. The method according to claim 13, further comprising, in response to the driven distance equaling the preconfigured distance and/or the driving time equaling the preconfigured time, controlling the robotic mower (2) to mow within the area (A).

15. A method for navigating a robotic mower (2) by a boundary wire (4) delimiting an area (A) and a loop (10) being at least partially arranged within the area (A), said robotic mower (2) comprising a first sensor (14) and a second sensor (14), the method comprising:
controlling the robotic mower (2) to follow the boundary wire (4) in a displacement distance using at least one of the sensors (12, 14),
in response to detecting, by the first sensor (14), that the first sensor (14) is arranged at an inside of the loop (10), straddling along the loop (10) using the second sensor (12);
when exiting, controlling the robotic mower (2) to exit a parking position at a station (11), wherein in the parking position the robotic mower (2) is at least partially arranged at an inside of a loop (10) of the station (11), determining that the robotic mower (2) has moved further outside of the loop (10) by detecting at least one signal of the loop (10) by the at least one sensor (12, 14),
detecting at least one signal of the boundary wire (4) by the at least one sensor (12, 14) and
controlling the robotic mower (2) to straddle along the boundary wire (4).

16. The method according to claim 15, further comprising detecting, by the first sensor (14), a further wire section (4a).

17. The method according to claim 16, further comprising, in response to detecting the further wire section (4a), controlling the robotic mower (2) to drive straight forward for a pre-configured time and/or a pre-configured distance.

18. The method according to claim 17, wherein the further wire section (4a) is a part of the boundary wire (4).

19. The method according to claim 18, further comprising controlling the robotic mower (2) to follow the further wire section (4a) to assume a parking position in which a battery (18) of the robotic mower (2) is charged by the station (11).

20. A method for navigating a robotic mower (2) by a wire (4, 8), said robotic mower (2) comprising at least one sensor (12; 14), the method comprising:
controlling the robotic mower (2) to exit a parking position at a station (11), wherein in the parking position the robotic mower (2) is at least partially arranged at an inside of a loop (10) of the station (11),
determining that the robotic mower (2) has moved further outside of the loop (10) by detecting at least one signal of the loop (10) by the at least one sensor (12, 14),
detecting at least one signal of the wire (4, 8) by the at least one sensor (12, 14),
controlling the robotic mower (2) to straddle along the wire (4, 8),
controlling the robotic mower (2) to increase the distance between the robotic mower (2) and the wire (4, 8) so that the robotic mower (2) is displaced from the wire (4, 8) by a displacement distance,
measuring, by the at least one sensor (12, 14), a signal level of at least one signal from the wire (4, 8), and
controlling the robotic mower (2) to follow the wire (4, 8) based on the measured signal level.

21. A robotic mower (2) for navigating by a wire (4, 8) and comprising at least one sensor (12, 14) and a control unit (22), wherein,
the control unit (22) is configured to control the robotic mower (2) to exit a parking position at a station (11), in the parking position the robotic mower (2) is at least partially arranged at an inside of a loop (10) of the station (11),
the at least one sensor (12, 14) is configured to determine that the robotic mower (2) is at least substantially arranged outside of the loop (10) by detecting at least one signal of the loop (10),
the at least one sensor (12, 14) is configured to detect at least one signal of the wire (4, 8) and
the control unit (22) is configured to control the robotic mower (2) to straddle along the wire (4, 8).

22. A robotic mower (2) for navigating by a boundary wire (4) delimiting an area (A) and a loop (10) being at least partially arranged within the area (A), the robotic mower (2) comprising a first sensor (14), a second sensor (14), and a control unit (22), wherein,
the control unit (22) is configured to control the robotic mower (2) to follow the boundary wire (4) in a displacement distance using at least one of the sensors (12, 14), and
the first sensor (14) is configured to detect that the first sensor (14) is arranged at an inside of the loop (10), then the control unit (22) is configured to control the robotic mower (2) to straddle along the loop (10) using the second sensor (12);
when exiting, the control unit (22) is configured to control the robotic mower (2) to exit a parking position at a station (11), wherein in the parking position the robotic mower (2) is at least partially arranged at an inside of the loop (10) of the station (11),
at least one sensor (12, 14) is configured to determine that the robotic mower (2) has moved further outside of the loop (10) by detecting at least one signal of the loop (10),
at least one sensor (12, 14) is configured to detect at least one signal of the wire (4), and
the control unit (22) is configured to control the robotic mower (2) to straddle along the wire (4).

23. A robotic mower (2) for navigating by a wire (4, 8) and comprising at least one sensor (12, 14) and a control unit (22), wherein,
the control unit (22) is configured to control the robotic mower (2) to exit a parking position at a station (11), wherein in the parking position the robotic mower (2) is at least partially arranged at an inside of a loop (10) of the station (11),
the at least one sensor (12, 14) is configured to determine that the robotic mower (2) has moved further outside of the loop (10) by detecting at least one signal of the loop (10),
the at least one sensor (12, 14) is configured to detect at least one signal of the wire (4, 8),
the control unit (22) is configured to control the robotic mower (2) to straddle along the wire (4, 8),
the control unit (22) is configured to control the robotic mower (2) to increase the distance between the robotic mower (2) and the wire (4, 8) so that the robotic mower (2) is displaced from the wire (4, 8) by a displacement distance,
the at least one sensor (12, 14) is configured to measure a signal level of at least one signal from the wire (4, 8), and
the control unit (22) is configured to control the robotic mower (2) to follow the wire (4, 8) based on the measured signal level.

* * * * *